US009985884B2

(12) United States Patent
Wang et al.

(10) Patent No.: US 9,985,884 B2
(45) Date of Patent: May 29, 2018

(54) DATA TRANSMISSION METHOD, APPARATUS, DEVICE, AND BASE STATION

(71) Applicant: Huawei Technologies Co., Ltd., Shenzhen (CN)

(72) Inventors: Jueping Wang, Shanghai (CN); Peng Lan, Shanghai (CN); Si Zhang, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 238 days.

(21) Appl. No.: 14/952,643

(22) Filed: Nov. 25, 2015

(65) Prior Publication Data
US 2016/0094447 A1 Mar. 31, 2016

Related U.S. Application Data

(63) Continuation of application No. PCT/CN2013/076434, filed on May 29, 2013.

(51) Int. Cl.
*H04L 12/741* (2013.01)
*H04W 88/10* (2009.01)
*H04W 16/14* (2009.01)
*H04W 88/08* (2009.01)

(52) U.S. Cl.
CPC ........... *H04L 45/745* (2013.01); *H04W 16/14* (2013.01); *H04W 88/10* (2013.01); *H04W 88/085* (2013.01)

(58) Field of Classification Search
CPC .................................................. H04L 45/745
See application file for complete search history.

(56) References Cited

U.S. PATENT DOCUMENTS

| 6,072,944 | A  | * | 6/2000  | Robinson    | G06F 9/465    |
|           |    |   |         |             | 716/117       |
| 7,577,122 | B1 | * | 8/2009  | Schultz     | H04L 27/0012  |
|           |    |   |         |             | 370/338       |
| 8,503,551 | B2 | * | 8/2013  | Ko          | H04L 1/0041   |
|           |    |   |         |             | 341/173       |
| 9,325,438 | B2 | * | 4/2016  | Ko          | H04H 20/42    |
| 2002/0031166 | A1 | * | 3/2002 | Subramanian | H04B 1/0003   |
|           |    |   |         |             | 375/130       |
| 2008/0181186 | A1 | * | 7/2008 | Rofougaran  | H04L 12/40006 |
|           |    |   |         |             | 370/338       |
| 2008/0279138 | A1 | * | 11/2008 | Gonikberg  | H04W 8/005    |
|           |    |   |         |             | 370/328       |
| 2009/0006675 | A1 | * | 1/2009 | Rofougaran  | H05K 5/0278   |
|           |    |   |         |             | 710/62        |

(Continued)

FOREIGN PATENT DOCUMENTS

CN 101309465 A 11/2008
CN 101557597 A 10/2009

(Continued)

*Primary Examiner* — Andrew Lai
*Assistant Examiner* — Andrew C Lee
(74) *Attorney, Agent, or Firm* — Slater Matsil, LLP

(57) ABSTRACT

The present invention provides a data transmission method, apparatus and device, and a base station, and relates to the field of communications technologies. The method of the present invention includes: receiving data sent by a radio unit; acquiring a standard identity of the data, where the standard identity is used to identify a standard type of the data; routing the data according to the standard identity of the data; and sending the routed data to a digital unit corresponding to the standard identity of the routed data.

20 Claims, 14 Drawing Sheets

(56) References Cited

U.S. PATENT DOCUMENTS

| | | | |
|---|---|---|---|
| 2009/0034442 A1* | 2/2009 | Song | H04H 20/30 370/310 |
| 2010/0016013 A1 | 1/2010 | Kabashima et al. | |
| 2010/0296469 A1 | 11/2010 | Zhou et al. | |
| 2012/0009977 A1 | 1/2012 | Yu et al. | |
| 2012/0250740 A1* | 10/2012 | Ling | H04W 88/085 375/219 |
| 2012/0296963 A1* | 11/2012 | Lu | H04W 84/00 709/203 |
| 2012/0307713 A1 | 12/2012 | Watanabe et al. | |
| 2012/0307806 A1* | 12/2012 | Agarwal | H04W 72/1252 370/336 |
| 2012/0321007 A1* | 12/2012 | Feher | H04W 64/00 375/261 |
| 2013/0016663 A1* | 1/2013 | Qiu | H04L 1/0051 370/328 |
| 2013/0128810 A1 | 5/2013 | Lee et al. | |
| 2015/0110497 A1 | 4/2015 | Zhou et al. | |

FOREIGN PATENT DOCUMENTS

| | | |
|---|---|---|
| CN | 102130716 A | 7/2011 |
| CN | 102264161 A | 11/2011 |
| CN | 102395227 A | 3/2012 |
| CN | 102723994 A | 10/2012 |
| EP | 2131602 A1 | 12/2009 |
| JP | 2011130179 A | 6/2011 |
| JP | 2015505427 A | 2/2015 |
| WO | 2008120297 A1 | 10/2008 |
| WO | 2013072108 A1 | 5/2013 |

* cited by examiner

DATA TRANSMISSION METHOD, APPARATUS, DEVICE, AND BASE STATION

CROSS-REFERENCE TO RELATED APPLICATIONS

This application is a continuation of International Application No. PCT/CN2013/076434, filed on May 29, 2013, which is hereby incorporated by reference in its entirety.

TECHNICAL FIELD

The present invention relates to the field of communications technologies, and in particular, to a data transmission method, apparatus and device, and a base station.

BACKGROUND

A base station under the cloud-radio access network (C-RAN) architecture is generally formed by two parts: namely, a remote station and a central station. The remote station includes a radio unit (RU), and is responsible for sending data to and receiving data from a user equipment (UE). The central station is a base band unit (BBU), and is responsible for processing and maintaining data received and sent by the remote station. The RU is installed nearby an antenna, the BBU is installed in a telecommunications room, and usually the two are connected through an optical fiber, and implement data communication through a common public radio interface (CPRI) protocol or other protocols. The RU and the BBU are geographically separated, and BBU is centrally placed. A multi-site RU can share a BBU resource, and can simplify originally distributed maintenance work to the side of the central station, thereby saving space and reducing setting cost.

At present, in the third generation communication technology (3G) network, the distributed base station architecture shown in FIG. 1 is used massively. In FIG. 1, the RU is connected to a digital unit (DU) through a routing device. Usually, one DU can be connected to RUs of a plurality of base stations to serve as a BBU shared by the plurality of base stations. The routing device is responsible for transmitting uplink data based on the CPRI protocol of one RU (CPRI data) to a DU, or transmitting downlink CPRI data of a DU to an RU. A plurality of DUs form a DU network (DU Cloud). In DU Cloud, DUs implement CPRI data exchanging through a DU switching unit (DU Switch). The DU cloud serves as a baseband resource pool for a plurality of base stations and processes and maintains CPRI data of each base station RU.

In the foregoing data transmission process, the inventor finds that the prior art at least has the following problems: usually, an RU includes a single-standard RU and a multi-standard RU, where the single-standard RU transmits CPRI data of one standard to the DU, and the multi-standard RU can transmit CPRI data of multiple standards to the DU simultaneously. When multi-DU tightly coupled coordination (such as coordinated multi-point transmission and reception technology (CoMP) is performed, if the multi-standard RU transmits CPRI data of multiple standards to the DUs simultaneously, CPRI data of different standards may be received by one DU if routing is only performed according to a routing relationship between an RU and a DU. Because each DU may only process CPRI data of one standard or multiple standards, the DUs need to exchange CPRI data of different standards through a DU Switch, so that CPRI data of these standards can be processed. For example, after receiving first standard CPRI data and second standard CPRI data, a DU for processing first standard CPRI data only processes the first standard CPRI data, and transmits the second standard CPRI data to a DU for processing second standard CPRI data. Frequent data transmission between the DUs increases data exchange traffic in the DU Cloud, and increases a resource burden of the DU Cloud.

SUMMARY OF THE INVENTION

The embodiments provide a data transmission method, apparatus and device, and a base station, which can solve problems of heavy data exchange traffic in DU Cloud and a heavy resource burden of the DU Cloud.

According to a first aspect, embodiments provide a data transmission method, which includes receiving data sent by a radio unit (RU) and acquiring a standard identity of the data, where the standard identity is used to identify a standard type of the data. The method also includes routing the data according to the standard identity of the data; and sending the routed data to a digital unit DU corresponding to the standard identity of the routed data.

In a first possible implementation manner of the first aspect, the data is divided into at least one line for receiving, and the acquiring a standard identity of the data specifically includes acquiring a standard identity of each data frame in each line of data, where when only one standard identity is acquired from the line of data, the line of data is a line of single-standard data, and when at least two standard identities are acquired from the line of data, the line of data is a line of multi-standard data.

With reference to the first aspect or the first possible implementation manner of the first aspect, the embodiments further provide a second possible implementation manner of the first aspect, and in the second possible implementation manner of the first aspect, before the routing the data according to the standard identity of the data, the method further includes dividing the data into at least one line for receiving. If a standard identity of a data frame in the line of data included in the received data includes at least two standard identities, the method also includes de-aggregating the line of data into at least two lines of single-standard data according to the at least two standard identities, where one of the standard identities corresponds to a line of single-standard data.

With reference to the first or second possible implementation manner of the first aspect, the embodiments further provide a third possible implementation manner of the first aspect, and in the third possible implementation manner of the first aspect, the routing the data according to the standard identity of the data specifically includes acquiring a first mapping relationship table, where the first mapping relationship table is used to represent a mapping relationship between a standard identity and a DU; and routing the line of single-standard data according to the standard identity of the line of single-standard data and the first mapping relationship table.

With reference to the first, second, or the third possible implementation manner of the first aspect, the embodiments further provide a fourth possible implementation manner of the first aspect, and in the fourth possible implementation manner of the first aspect, before the sending the routed data to a DU corresponding to the standard identity of the routed data, the method further includes aggregating at least two lines of single-standard data that have a same standard identity into one line of combined single-standard data, where a data transmission rate of the combined single-standard data is higher than a data transmission rate of one line of single-standard data. The sending the routed data to a digital unit DU corresponding to the standard identity of the routed data specifically includes sending the combined single-standard data to a DU corresponding to a standard identity of the combined single-standard data.

With reference to the first aspect or the first, second, third, or fourth possible implementation manner of the first aspect, the embodiments further provide a fifth possible implementation manner of the first aspect, and in the fifth possible implementation manner of the first aspect, the types of the standard identity include: Global System for Mobile Communications (GSM), Time Division-Synchronous Code Division Multiple Access (TD-SCDMA), Code Division Multiple Access 2000 (CDMA2000), Wideband Code Division Multiple Access (WCDMA), Universal Mobile Telecommunications System (UMTS) or Long Term Evolution (LTE).

According to a second aspect, the embodiments further provide a data transmission method, where the method includes receiving single-standard data sent by a digital unit DU; routing the single-standard data; combining at least two lines of single-standard data into one line of multi-standard data; and sending the multi-standard data to a corresponding radio unit RU.

In a first possible implementation manner of the second aspect, before the routing the single-standard data, the method further includes: acquiring a target identity of the single-standard data, where the target identity is used to identify an RU receiving the single-standard data.

With reference to the first possible implementation manner of the second aspect, the embodiments further provide a second possible implementation manner of the second aspect, and in the second possible implementation manner of the second aspect, the routing the single-standard data specifically includes: routing the single-standard data according to the target identity.

With reference to the first or second possible implementation manner of the second aspect, the embodiments further provide a third possible implementation manner of the second aspect, and in the third possible implementation manner of the second aspect, the combining at least two lines of single-standard data into one line of multi-standard data specifically includes: combining at least two lines of single-standard data having a same target identity but different standard identities into one line of multi-standard data, where the standard identity is used to identify a standard type of a line of single-standard data.

With reference to the first, second, or third possible implementation manner of the second aspect, the embodiments further provide a fourth possible implementation manner of the second aspect, and in the fourth possible implementation manner of the second aspect, the sending the multi-standard data to a corresponding radio unit RU specifically includes: sending the multi-standard data to a corresponding RU according to the target identity.

With reference to the second aspect or the first, second, third, or fourth possible implementation manner of the second aspect, embodiments further provide a fifth possible implementation manner of the second aspect, and in the fifth possible implementation manner of the second aspect, before the combining at least two lines of single-standard data having a same target identity but different standard identities into one line of multi-standard data, the method further includes breaking one line of single-standard data down into at least two lines of single-standard subdata, where a data rate of the single-standard subdata obtained through breakdown is lower than a data rate of the single-standard data before breakdown. The combining at least two lines of single-standard data into one line of multi-standard data specifically includes combining the at least two lines of single-standard subdata into one line of multi-standard data.

With reference to the second aspect or the first, second, third, fourth, or fifth possible implementation manner of the second aspect, the embodiments further provide a sixth possible implementation manner of the second aspect, and in the sixth possible implementation manner of the second aspect, the target identity of the data is an RU identity or a port number.

With reference to the second aspect or the first, second, third, fourth, fifth, or sixth possible implementation manner of the second aspect, the embodiments further provide a seventh possible implementation manner of the second aspect, and in the seventh possible implementation manner of the second aspect, the types of the standard identity include: Global System for Mobile Communications (GSM), Time Division-Synchronous Code Division Multiple Access (TD-SCDMA), Code Division Multiple Access 2000 (CDMA2000), Wideband Code Division Multiple Access (WCDMA), Universal Mobile Telecommunications System (UMTS) or Long Term Evolution (LTE).

According to a third aspect, the embodiments further provide a data transmission apparatus, where the apparatus includes a receiving unit, configured to receive data sent by a radio unit RU and an acquisition unit, configured to acquire a standard identity of the data received by the receiving unit, where the standard identity is used to identify a standard type of the data. The apparatus also includes a routing unit, configured to route, according to the standard identity of the data acquired by the acquisition unit, the data received by the receiving unit; and a sending unit, configured to send, to a digital unit DU corresponding to the standard identity of the routed data, the data routed by the routing unit.

In a first possible implementation manner of the third aspect, the receiving unit is configured to receive the data that is divided into at least one line. The acquisition unit is specifically configured to: acquire a standard identity of each data frame in each line of data received by the receiving unit, where when only one standard identity is acquired from the line of data, the line of data is a line of single-standard data, and when at least two standard identities are acquired from the line of data, the line of data is a line of multi-standard data.

With reference to the third aspect or the first possible implementation manner of the third aspect, the embodiments further provide a second possible implementation manner of the third aspect, and in the second possible implementation manner of the third aspect, the apparatus further includes a deaggregation unit. The receiving unit is configured to receive the data that is divided into at least one line; and the deaggregation unit is configured to, before the routing unit routes, according to the standard identity of the data acquired by the acquisition unit, the data received by the receiving unit, when a standard identity of a data frame in one line of data included in the received data includes at least two standard identities, deaggregate the one line of data into at least two lines of single-standard data according to the at least two standard identities, where one of the standard identities corresponds to a line of single-standard data.

With reference to the first or second possible implementation manner of the third aspect, the embodiments further provide a third possible implementation manner of the third aspect, and in the third possible implementation manner of the third aspect, the routing unit includes an acquisition subunit, configured to acquire a first mapping relationship table, where the first mapping relationship table is used to represent a mapping relationship between a standard identity and a DU; and a routing subunit, configured to route the line of single-standard data according to the standard identity of the line of single-standard data and the first mapping relationship table acquired by the acquisition subunit.

With reference to the first, second, or third possible implementation manner of the third aspect, the embodiments further provide a fourth possible implementation manner of the third aspect, and in the fourth possible implementation manner of the third aspect, the apparatus further includes an aggregation unit. The aggregation unit is configured to, before the sending unit sends the data routed by the routing unit to a DU corresponding to the standard identity of the routed data, aggregate at least two lines of single-standard data that have a same standard identity into one line of combined single-standard data, where a data transmission rate of the combined single-standard data is higher than a data transmission rate of one line of single-standard data. The sending unit is further configured to send the combined single-standard data aggregated by the aggregation unit to a DU corresponding to a standard identity of the combined single-standard data.

With reference to the third aspect or the first, second, third, or fourth possible implementation manner of the third aspect, the embodiments further provide a fifth possible implementation manner of the third aspect, and in the fifth possible implementation manner of the third aspect, the types of the standard identity acquired by the acquisition unit include: Global System for Mobile Communications (GSM), Time Division-Synchronous Code Division Multiple Access (TD-SCDMA), Code Division Multiple Access 2000 (CDMA2000), Wideband Code Division Multiple Access (WCDMA), Universal Mobile Telecommunications System (UMTS) or Long Term Evolution (LTE).

According to a fourth aspect, the embodiments further provide a data transmission apparatus. The apparatus includes a receiving unit, configured to receive single-standard data sent by a digital unit (DU); a routing unit, configured to route the single-standard data received by the receiving unit; a combining unit, configured to combine at least two lines of single-standard data routed by the routing unit into one line of multi-standard data; and a sending unit, configured to send the multi-standard data combined by the combining unit to a corresponding radio unit (RU).

In a first possible implementation manner of the fourth aspect, the apparatus further includes an acquisition unit, where the acquisition unit is configured to acquire a target identity of the single-standard data before the routing unit routes the single-standard data, where the target identity is used to identify an RU receiving the single-standard data.

With reference to the first possible implementation manner of the fourth aspect, the embodiments further provide a second possible implementation manner of the fourth aspect, and in the second possible implementation manner of the fourth aspect, the routing unit is specifically configured to route the single-standard data according to the target identity acquired by the acquisition unit.

With reference to the first or second possible implementation manner of the fourth aspect, the embodiments further provide a third possible implementation manner of the fourth aspect, and in the third possible implementation manner of the fourth aspect, the combining unit is specifically configured to combine at least two lines of single-standard data having a same target identity but different standard identities into one line of multi-standard data, where the standard identity is used to identify a standard type of a line of single-standard data.

With reference to the first, second or third possible implementation manner of the fourth aspect, the embodiments further provide a fourth possible implementation manner of the fourth aspect, and in the fourth possible implementation manner of the fourth aspect, the sending unit is specifically configured to send the multi-standard data to a corresponding RU according to the target identity acquired by the acquisition unit.

With reference to the fourth aspect or the first, second, third or fourth possible implementation manner of the fourth aspect, the embodiments further provide a fifth possible implementation manner of the fourth aspect, and in the fifth possible implementation manner of the fourth aspect, the apparatus further includes a breakdown unit. The breakdown unit is configured to, before the combining unit combines at least two lines of single-standard data having a same target identity but different standard identities into one line of multi-standard data, break one line of single-standard data down into at least two lines of single-standard subdata, where a data rate of the single-standard subdata obtained through breakdown is lower than a data rate of the single-standard data before breakdown. The combining unit is further configured to combine the at least two lines of single-standard subdata broken down by the breakdown unit into one line of multi-standard data.

With reference to the fourth aspect or the first, second, third, fourth, or fifth possible implementation manner of the fourth aspect, the embodiments further provide a sixth possible implementation manner of the fourth aspect, and in the sixth possible implementation manner of the fourth aspect, the target identity of the data acquired by the acquisition unit is an RU identity or a port number.

According to a fifth aspect, the embodiments further provide a data transmission apparatus. The apparatus includes an input and output circuit, configured to receive data sent by a radio unit RU; and a processor, configured to acquire a standard identity of the data received by the input and output circuit, where the standard identity is used to identify a standard type of the data. The apparatus also includes a memory, configured to store the standard identity acquired by the processor, where the processor is further configured to route the data received by the input and output circuit according to the standard identity of the data stored by the memory; and the input and output circuit is further configured to send the data routed by the processor to a digital unit DU corresponding to the standard identity of the routed data, where the input and output circuit, the processor, and the memory communicate through a bus.

In a first possible implementation manner of the fifth aspect, the input and output circuit is configured to receive the data that is divided into at least one line; and the processor is specifically configured to acquire a standard identity of each data frame in each line of data received by the input and output circuit, where when only one standard identity is acquired from the line of data, the line of data is a line of single-standard data, and when at least two standard identities are acquired from the line of data, the line of data is a line of multi-standard data.

With reference to the fifth aspect or the first possible implementation manner of the fifth aspect, the embodiments further provide a second possible implementation manner of the fifth aspect, and in the second possible implementation manner of the fifth aspect, the input and output circuit is configured to receive the data that is divided into at least one line. The processor is further configured to, before the data received by the receiving unit is routed according to the standard identity of the data acquired by the acquisition unit, and when a standard identity of a data frame in one line of data included in the received data includes at least two standard identities, deaggregate the one line of data into at least two lines of single-standard data according to the at least two standard identities, where one of the standard identities corresponds to a line of single-standard data.

With reference to the first or second possible implementation manner of the fifth aspect, the embodiments further provide a third possible implementation manner of the fifth aspect, and in the third possible implementation manner of the fifth aspect, the memory is further configured to store a first mapping relationship table, where the first mapping relationship table is used to represent a mapping relationship between a standard identity and a DU. The processor is further configured to acquire the first mapping relationship table, and route the line of single-standard data according to the standard identity of the line of single-standard data and the first mapping relationship table.

With reference to the first, second or third possible implementation manner of the fifth aspect, the embodiments further provide a fourth possible implementation manner of the fifth aspect, and in the fourth possible implementation manner of the fifth aspect, the processor is further configured to, before the input and output circuit sends the data routed by the processor to a DU corresponding to the standard identity of the routed data, aggregate at least two lines of single-standard data that have a same standard identity into one line of combined single-standard data, where a data transmission rate of the combined single-standard data is higher than a data transmission rate of one line of single-standard data. The input and output circuit is further configured to send the combined single-standard data aggregated by the processor to a DU corresponding to a standard identity of the combined single-standard data.

With reference to the fifth aspect or the first, second, third, or fourth possible implementation manner of the fifth aspect, the embodiments further provide a fifth possible implementation manner of the fifth aspect, and in the fifth possible implementation manner of the fifth aspect, the types of the standard identity acquired by the processor include: Global System for Mobile Communications (GSM), Time Division-Synchronous Code Division Multiple Access (TD-SCDMA), Code Division Multiple Access 2000 (CDMA2000), Wideband Code Division Multiple Access (WCDMA), Universal Mobile Telecommunications System (UMTS) or Long Term Evolution (LTE).

According to a sixth aspect, the embodiments further provide a data transmission apparatus. The apparatus includes an input and output circuit, configured to receive single-standard data sent by a digital unit DU; and a processor, configured to route the single-standard data received by the input and output circuit. The processor is further configured to combine at least two lines of the routed single-standard data into one line of multi-standard data. The input and output circuit is further configured to send the multi-standard data combined by the processor to a corresponding radio unit RU, where the input and output circuit and the processor communicate through a bus.

In a first possible implementation manner of the sixth aspect, the processor is further configured to acquire a target identity of the single-standard data before the single-standard data is routed, where the target identity is used to identify an RU receiving the single-standard data; the apparatus further includes a memory, where the memory communicates with the input and output circuit and the processor through the bus; and the memory is configured to store a standard identity acquired by the processor.

With reference to the first possible implementation manner of the sixth aspect, the embodiments further provide a second possible implementation manner of the sixth aspect, and in the second possible implementation manner of the sixth aspect, the routing unit is specifically configured to route the single-standard data according to the target identity stored by the memory.

With reference to the second possible implementation manner of the sixth aspect, the embodiments further provide a third possible implementation manner of the sixth aspect, and in the third possible implementation manner of the sixth aspect, the processor is specifically configured to combine at least two lines of single-standard data having a same target identity but different standard identities into one line of multi-standard data, where the standard identity is used to identify a standard type of a line of single-standard data.

With reference to the first, second or third possible implementation manner of the sixth aspect, the embodiments further provide a fourth possible implementation manner of the sixth aspect, and in the fourth possible implementation manner of the sixth aspect, the input and output circuit is specifically configured to send the multi-standard data to a corresponding RU according to the target identity stored by the memory.

With reference to the sixth aspect or the first, second, third or fourth possible implementation manner of the sixth aspect, the embodiments further provide a fifth possible implementation manner of the sixth aspect, and in the fifth possible implementation manner of the sixth aspect. The processor is further configured to, before at least two lines of single-standard data having a same target identity but different standard identities into one line of multi-standard data are combined, break one line of single-standard data down into at least two lines of single-standard subdata, where a data rate of the single-standard subdata obtained through breakdown is lower than a data rate of the single-standard data before breakdown. The processor is further configured to combine the at least two lines of single-standard subdata after breakdown into one line of multi-standard data.

With reference to the sixth aspect or the first, second, third, fourth, or fifth possible implementation manner of the sixth aspect, the embodiments further provide a sixth possible implementation manner of the sixth aspect, and in the sixth possible implementation manner of the sixth aspect, the target identity of the data acquired by the processor is an RU identity or a port number.

According to a seventh aspect, the embodiments further provide a data transmission device, where the device includes the apparatus described in the third aspect and/or the apparatus described in the fourth aspect.

According to an eight aspect, the embodiments further provide a data transmission device, where the device includes a first apparatus and a second apparatus. The first apparatus is configured to receive data sent by a radio unit RU, acquire a standard identity of the data, where the standard identity is used to identify a standard type of the data, route the data according to the standard identity of the data, and send the routed data to a digital unit DU corresponding to the standard identity of the routed data. The second apparatus is configured to receive single-standard data sent by a digital unit DU, route the single-standard data, combine at least two lines of single-standard data into one line of multi-standard data, and send the multi-standard data to a corresponding radio unit RU.

According to a ninth aspect, the embodiments further provide a data transmission device, where the device includes the apparatus described in the fifth aspect and/or the apparatus described in the sixth aspect.

According to a tenth aspect, the embodiments further provide a data transmission device, where the device includes an input and output circuit, configured to receive single-standard data sent by a digital unit DU; and a processor, configured to route the single-standard data received by the input and output circuit. The processor is further configured to combine at least two lines of the routed single-standard data into one line of multi-standard data. The input and output circuit is further configured to send the multi-standard data combined by the processor to a corresponding radio unit RU. The input and output circuit is further configured to receive data sent by the radio unit RU. The processor is further configured to acquire a standard identity of data sent by an RU and received by the input and output circuit, where the standard identity is used to identify a standard type of the data. The memory is configured to store the standard identity acquired by the processor; and the processor is further configured to route the data sent by the RU and received by the input and output circuit according to the standard identity of the data stored by the memory. The input and output circuit, the processor, and the memory communicate through a bus.

According to an eleventh aspect, the embodiments further provide a base station, where the base station includes a radio unit RU, a digital unit DU, and the data transmission device according to any one of the seventh to eleventh aspect. The data transmission device is independent from the RU and the DU, and the data transmission device establishes communication with the RU and the DU respectively; or the data transmission device is integrated in the DU, and establishes communication with the RU.

In the data transmission method, apparatus, device and the base station provided by the embodiments, when an RU sends data to a DU, a standard identity in the data can be acquired, the data can be routed according to the standard identity of the data, and then the routed data can be sent to a digital unit DU corresponding to the standard identity of the routed data. When a DU sends single-standard data to an RU, the single-standard data sent by the DU can be received, the received single-standard data can be routed, at least two lines of single-standard data can then be combined into one line of multi-standard data, and the multi-standard data can be sent to a corresponding radio unit RU in the end. Compared with the prior art that a routing device routes data that is sent by an RU and includes multiple standards to a DU according to a configured routing relationship between an RU and a DU, a DU can be prevented from transmitting data of a standard that the DU does not process to another DU through a DU Switch, thereby reducing data exchange traffic in DU Cloud, and reducing a resource burden of the DU Cloud. In addition, compared with the prior art that a routing device directly routes single-standard data sent by a DU to a multi-standard RU, a multi-standard RU can receive multi-standard data correctly, and data transmission efficiency can be improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments with reference to the accompanying drawings in the embodiments. Apparently, the described embodiments are merely a part rather than all of the embodiments of the present invention. All other embodiments obtained by a person of ordinary skill in the art based on the embodiments without creative efforts shall fall within the protection scope of the present invention.

Generally, an RU may only receive and send data of one standard, and may also receive and send data of multiple standards. When the RU only receives and sends data of one standard, the RU is referred to as a single-standard RU, and when the RU can receive and send data of multiple standards, the RU is referred to as a multi-standard RU. In DU Cloud, the DU may be configured to process data of one standard only, and may also be configured to process data of multiple standards.

The standard in the embodiment is defined by the type of data transmitted between an RU and a DU. For example, if GSM network data is transmitted between a RU and a DU in a 2G network, the standard of the RU is GSM, and if WCDMA network data is transmitted between an RU and a DU in a 3G network, the standard of the RU is WCDMA. The related standard in the embodiments include, but is not limited to: Global System for Mobile Communications (GSM), Time Division-Synchronous Code Division Multiple Access (TD-SCDMA), Code Division Multiple Access 2000 (CDMA2000), Wideband Code Division Multiple Access (WCDMA), Universal Mobile Telecommunications System (as UMTS) and Long Term Evolution (LTE).

An RU and a routing device, and a DU and a routing device are connected through an interface. The type of the interface is a baseband-radiofrequency interface (BB-RF interface), which, for example, may be a CPRI interface, an open base station architecture initiative interface (OBSAI interface), and so on. The embodiment is mainly described by using an example of a CPRI interface. When the type of the interface is CPRI, data of multiple standards transmitted between an RU and a DU is generally referred to as CPRI data. A CPRI interface may also include a single-standard interface and a multi-standard interface, where the single-standard CPRI interface is configured to connect a single-standard RU or a single-standard DU, and the multi-standard CPRI interface is configured to connect a multi-standard RU or a multi-standard DU. It should be understood that, the embodiment may also be applied to another BB-RF interface other than the CPRI interface.

The embodiments are described in the following.

Figure 1:
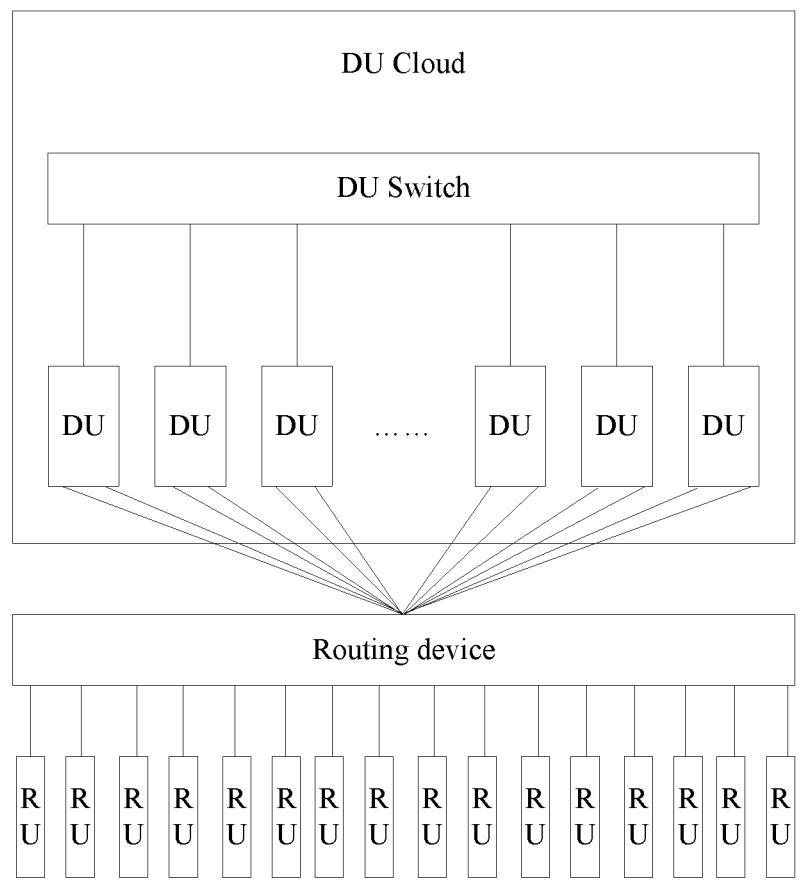
FIG. 1 is a schematic diagram of distributed base station architecture.
Figure 2:
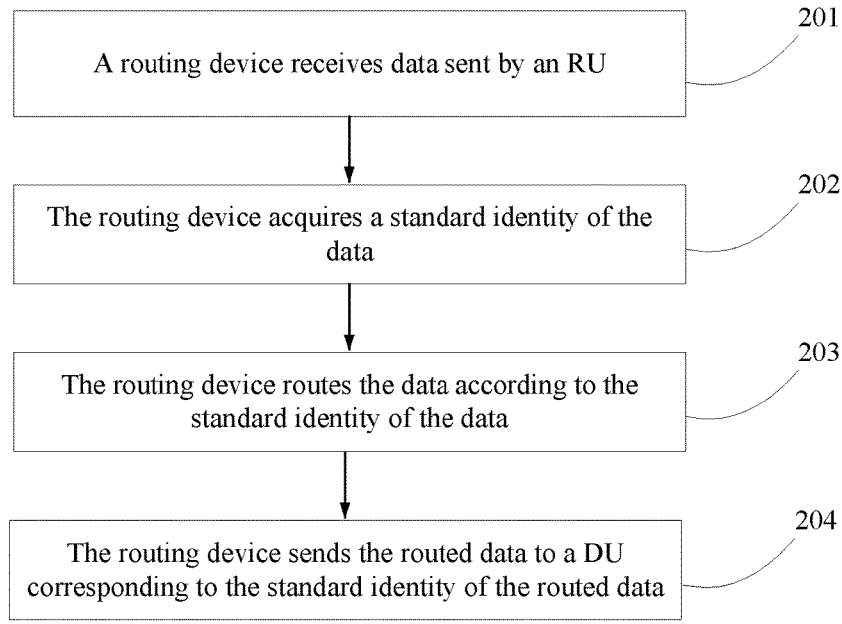
FIG. 2 is a flow chart of a data transmission method in an embodiment.

An embodiment provides a data transmission method, and as shown in FIG. 2, the method includes the following steps.

201: A routing device receives data sent by an RU.

Generally, one RU can transmit CPRI data to a DU through one or more CPRI interfaces. The CPRI data transmitted by the RU through one CPRI interface is referred to as one line of CPRI data, and the CPRI data transmitted through a plurality of CPRI interfaces is referred to as multi-line CPRI data. The RU can transmit CPRI data of one standard only in one line of CPRI data (that is, one line of CPRI data only carries CPRI data of one standard identity), and can also transmit CPRI data of multiple standards in one line of CPRI data (that is, one line of CPRI data carries CPRI data of at least two standard identities). In the embodiment, the routing device divides the CPRI data into at least one line for receiving, that is, the routing device receives at least one line of CPRI data, and when the routing device receives a plurality of lines of CPRI data, the plurality of lines of CPRI data may come from a plurality of RUs, and may also come from one RU, which is not limited in the embodiment.

202: The routing device acquires a standard identity of the data.

Taking one line of CPRI data as an example for description, after the routing device receives one line of CPRI data, a standard identity of a data frame in the line of CPRI data is acquired, where the standard identity is used to identify a standard type of the data, for example, GSM data, WCDMA data, and so on. When the line of CPRI data only carries data of one standard, the routing device acquires one standard identity, and the line of CPRI data is single-standard CPRI data. When the line of CPRI data carries data of more than two standards, the routing device acquires more than two standard identities, and the line of CPRI data is multi-standard CPRI data. For example, when one line of CPRI data carries data of three standards, namely, GSM, LTE and CDMA2000, the routing device may acquire three standard identities: GSM, LTE and CDMA2000.

In the embodiment, the line of CPRI data may carry data of one standard, and in addition, the data may also carry data of more than two standards. Specifically, one line of CPRI data may carry data frames of multiple standards, or a data frame in the CPRI data may carry data of multiple standards, which is not limited in the embodiment.

The standard identity may be several bits, and a binary digit is used to identify a different standard. For example, 001 represents the GSM standard, and 110 represents the LTE standard. Alternatively, the standard identity may be a string of characters to identify standards of different types. For example, three letters GSM represents the GSM standard. The embodiment does not limit the form of the standard identity.

It should be noted that, the number of types of the standard identities acquired by the routing device in step 202 is the same as the number of standard types of the data frames carried in the CPRI data. For example, if one line of CPRI data carries data frames of three types, namely, GSM, LTE and CDMA2000, at least one standard identity acquired by the routing device specifically is three standard identities of GSM, LTE and CDMA2000.

203: The routing device routes the data according to the standard identity of the data.

Still taking one line of CPRI data as an example, when one line of CPRI data only carries CPRI data of one standard, the routing device may route the line of CPRI data according to the standard identity of the line of CPRI data and a first mapping relationship table, where the first mapping relationship table is used to represent a mapping relationship between a standard identity and a DU. For example, the standard identity GSM corresponds to DU1, and the standard identity LTE corresponds to DU2. The routing device routes the CPRI data to a DU corresponding to the standard identity of the CPRI data according to the first mapping relationship table.

204: The routing device sends the routed data to a DU corresponding to the standard identity of the routed data.

Generally, the routing device is connected to the DU through a CPRI interface. After the CPRI data is routed according to the first mapping table, the routing device sends the routed CPRI data to a DU corresponding to the CPRI interface through different CPRI interfaces. In fact, the standard identity corresponds to a CPRI interface identity/serial number in the first mapping relationship table, and the routing device routes different CPRI data to each CPRI interface, and then sends the CPRI data through each CPRI interface. The mapping relationship between a CPRI interface and a DU may be determined through configuration. For example, a CPRI interface 1 is configured corresponding to a DU processing GSM data. During routing, the routing device routes GSM data to the CPRI interface 1, and then sends the GSM data to the DU processing GSM data through the CPRI interface 1.

Generally, the processing load of the DU processing multi-standard CPRI data is higher than the processing load of processing single-standard CPRI data, and therefore, during multi-DU tightly coupled coordination, a part of DUs are configured as DUs which dedicatedly process single-standard CPRI data of a kind. When the routing device routes the CPRI data to the DU, one line of multi-standard CPRI data is deaggregated into a plurality of lines of single-standard CPRI data, and then the plurality of lines of single-standard CPRI data is routed to corresponding DUs, respectively. Therefore, the problem that after receiving multi-standard CPRI data, the DUs transmit data of a standard that the DUs do not process to another DU is solved. Because no data needs to be transmitted between the DUs, data transmission traffic between the DUs may be reduced, thereby reducing a resource burden of DU Cloud.

In the embodiment, that the routing device routes the single-standard CPRI data to a corresponding DU specifically refers to routing the single-standard CPRI data to a DU processing the single-standard CPRI data. For example, the GSM single-standard data is routed to a DU processing GSM data.

It should be understood that, the routing device in the embodiment may be a data transmission apparatus in another embodiment.

In the prior art, a routing device only has a routing function, that is, only routes received single-standard CPRI data or multi-standard CPRI data to a DU that has a connection relationship with an RU according to a configured routing relationship between an RU and a DU, and cannot route the CPRI data according to a standard identity of the CPRI data. If CPRI data of a standard is routed to a DU that cannot process the CPRI data of the standard, the DU needs to transmit the CPRI data of the standard to another DU that can process the CPRI data of the standard, and therefore data exchange traffic between DUs occurs.

With the data transmission method provided in the embodiment, when an RU sends data to a DU, a standard identity in the data can be acquired, the data can be routed according to the standard identity of the data, and then the routed data can be sent to a digital unit DU corresponding to the standard identity of the routed data. Compared with the prior art that a routing device only routes, data that is sent by an RU to a DU corresponding to the RU according to a configured routing relationship between an RU and a DU, a DU can be prevented from receiving data of a standard that the DU cannot process, and further the DU can be prevented from transmitting the data of the standard that the DU does not process to another DU through a DU Switch, thereby reducing data exchange traffic in DU Cloud, and reducing a resource burden of the DU Cloud.

Further, as a detailed description and further expansion to the method shown in FIG. 2, an embodiment further provides a data transmission method, including the following.

Figure 3:
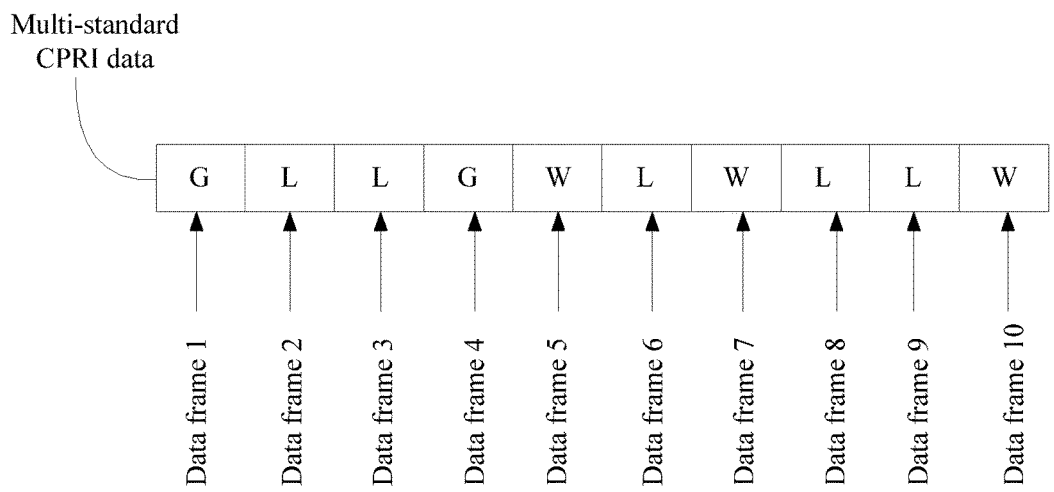
FIG. 3 is a schematic diagram of multi-standard CPRI data in an embodiment.

To detail step 202 in FIG. 2, when receiving a line of CPRI data sent through a CPRI interface, the routing device may extract the standard identity in each CPRI data frame in the line of CPRI data, and acquire at least one standard identity from the extracted plurality of standard identities. For example, for a line of single-standard CPRI data that includes 10 CPRI data frames, the routing device extracts the standard identity of each CPRI data frame, and obtains a standard identity. In another example, for multi-standard CPRI data, as shown in FIG. 3, the line of multi-standard CPRI data carries 10 CPRI data frames, and the 10 CPRI data frames include 2 GSM data frames, 5 LTE data frames and 3 WCDMA data frames, where the 10 CPRI data frames are alternately arranged as shown in FIG. 3. The standard identity 1 to the standard identity 10 acquired by the routing device are: G, L, L, G, W, L, W, L, L and W in order. The routing device acquires 3 standard identities from the 10 standard identities: G, L and W, and the three standard identities are different from each other.

In an existing protocol specification, a special byte serving as a standard identity can be added in a CPRI data frame, and a routing device can directly read the special byte in each CPRI data frame after receiving the CPRI data frame, thereby obtaining the standard identity of each CPRI data frame.

In the foregoing multi-standard CPRI data, one CPRI data frame carries CPRI data of a standard, and the number of standard identities acquired by the routing device is the same as the number of the CPRI data frames. In addition, in an existing standard, one CPRI data frame can also carry CPRI data of multiple standards, and all the standard identities of the CPRI data carried in the CPRI data frame may be added in the CPRI data frame. The number of the standard identities acquired by the routing device is greater than the number of the CPRI data frames. The routing device can process and route the multi-standard CPRI data formed by the two CPRI data frames, and in later description of the embodiment, an example in which one CPRI data frame carries data of one standard is used for description.

It should be noted that, two different descriptions should be distinguished clearly in this step: 1) a plurality of standard identities; 2) a plurality of types of standard identities. When one CPRI data frame carries data of one standard, the number of the plurality of standard identities is the same as the number of the CPRI data frames, that is, the routing device acquires one standard identity from each CPRI data frame (it should be noted that, the plurality of standard identities shown in FIG. 3 has the same standard identity). The number of the plurality of types of standard identities is the same as the number of the standard types of all the CPRI data frames in the multi-standard CPRI data. That is, in FIG. 3, the routing device acquires 3 types of standard identities. Because the routing device acquires the standard identity of each CPRI data frame, and the CPRI data frames with the same standard exist, for one line of multi-standard CPRI data, the types of the standard identities acquired by the routing device are less than the number of the acquired standard identities.

Optionally, when a line of CPRI data carries data of more than two standards (that is, multi-standard CPRI data), before the line of CPRI data is routed according to standard identity of the line of CPRI data, the routing device can first deaggregate the line of CPRI data into more than two lines of single-standard CPRI data according to acquired different standard identities, where one standard identity corresponds to one line of single-standard CPRI data. The routing device may then route each line of single-standard CPRI data according to the standard identity of each line of single-standard CPRI data and the first mapping relationship table, respectively. For example, when a line of CPRI data carries a GSM data frame and an LTE data frame, the routing device deaggregates the line of CPRI data into two lines of single-standard CPRI data, where one line of single-standard CPRI data is formed by the GSM data frame, and the other line of single-standard CPRI data is formed by the LTE data frame. For the GSM single-standard CPRI data, the routing device searches for a DU corresponding to the GSM standard identity according to the first mapping relationship table, and then routes the GSM single-standard CPRI data to the DU; the processing is similar for the LTE single-standard CPRI data and is not described herein again.

It should be noted that, when one line of CPRI data is deaggregated, the number of lines of the deaggregated single-standard data may be equal to the number of the types of the standard identities carried in the line of CPRI data, that is, the routing device acquires several types of standard identities, and deaggregates the line of CPRI data into several lines of single-standard CPRI data. Each line of the deaggregated single-standard CPRI data only carries a data frame of one standard, and for example, GSM single-standard data only carries a GSM data frame.

Figure 4:
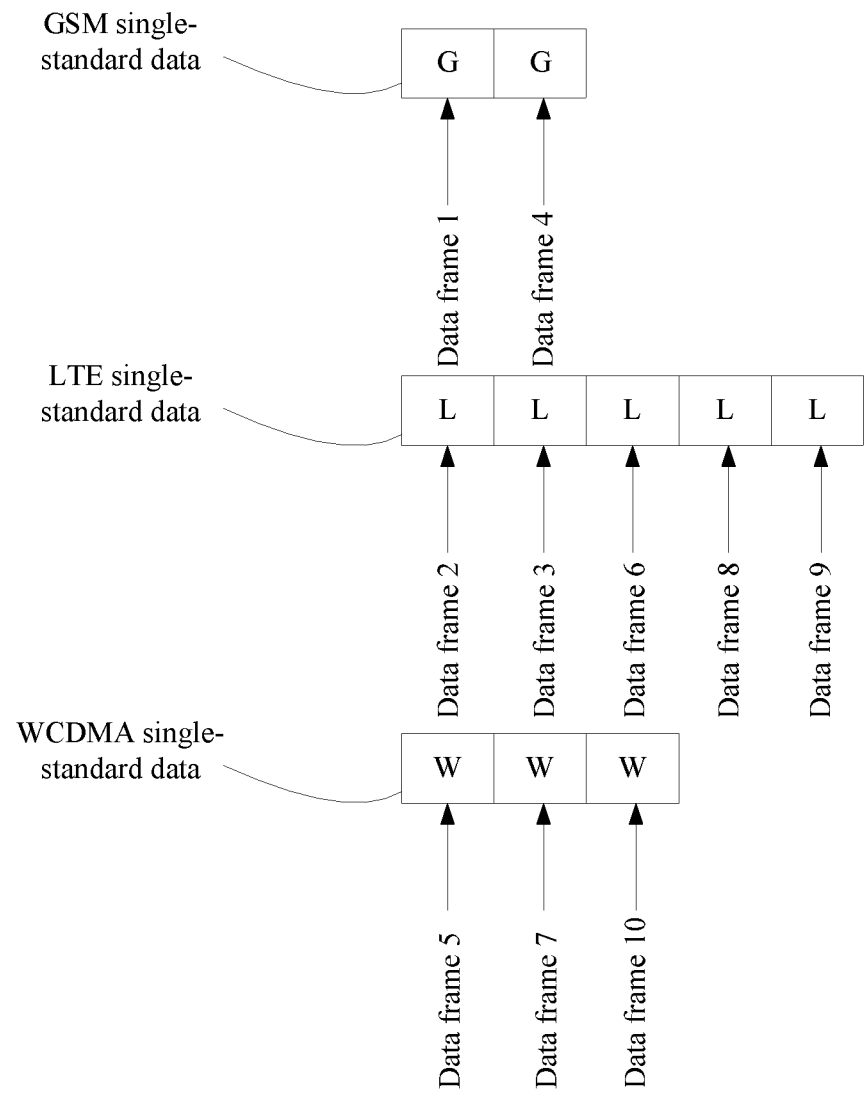
FIG. 4 is a schematic diagram of 3 lines of deaggregated single-standard CPRI data in an embodiment.

When one line of multi-standard CPRI data is deaggregated into at least two lines of single-standard CPRI data, the routing device aggregates data frames of the same standard identity into one line of single-standard CPRI data. The routing device determines the number of lines of deaggregated CPRI single-standard CPRI data according to the type of the standard identity, and adds the CPRI data frame to a corresponding single-standard CPRI data according to the standard identity of each CPRI data frame in the multi-standard CPRI data. Specifically, the routing device in FIG. 3 acquires three types of standard identities, namely, GSM, LTE and WCDMA. The routing device determines that the number of lines of the single-standard CPRI data is 3. The routing device then adds a CPRI data frame whose standard identity is G to GSM single-standard data, adds a CPRI data frame whose standard identity is L to LTE single-standard data, and adds a CPRI data frame whose standard identity is W to WCDMA single-standard data. Three lines of single-standard CPRI data deaggregated in that way are shown in FIG. 4.

Figure 5:
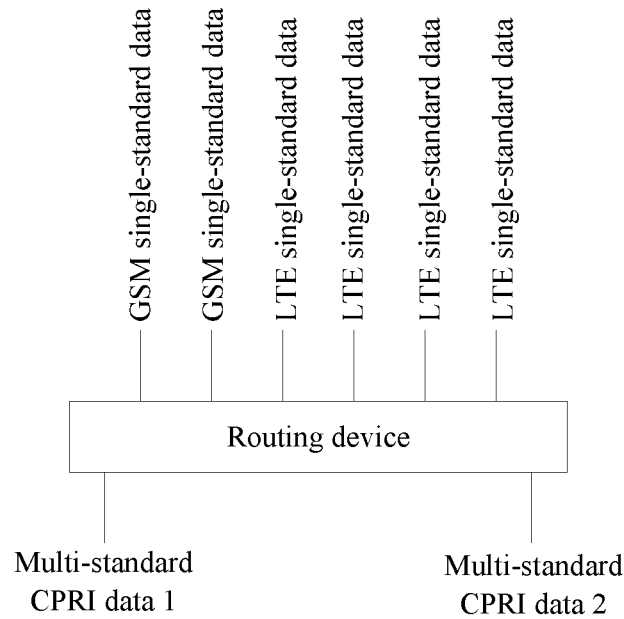
FIG. 5 is a schematic diagram of selecting a routing path for single-standard CPRI data in an embodiment.

In the embodiment, that one line of multi-standard CPRI data is deaggregated is used as an example for description. In an actual application, the routing device may deaggregate a plurality of lines of multi-standard CPRI data simultaneously, and in this way, a plurality of lines of single-standard CPRI data of the same standard, for example, 3 lines of GSM single-standard data, can be deaggregated. As a preferred solution in step 203, the routing device can select adjacent routing paths for a plurality of lines of single-standard CPRI data of the same standard, that is, select adjacent CPRI interfaces for the plurality of lines of single-standard CPRI data of the same standard (the CPRI interface herein refers to a CPRI interface between the routing device and the DU), thereby facilitating the management of CPRI interfaces and increasing the efficiency of using the CPRI interfaces. Specifically, the routing device deaggregates multi-standard CPRI data 1 and multi-standard CPRI data 2 to obtain 2 lines of GSM single-standard data and 4 lines of LTE single-standard data, respectively. The routing paths that the routing device selects for the 6 lines of single-standard CPRI data are shown in FIG. 5.

The number of RUs that communicate with a DU is large, and a routing device combines a plurality of lines of single-standard CPRI data of the same standard and sends them to a DU through a CPRI interface. Therefore, the number of CPRI interfaces used on a DU can be reduced, and a CPRI interface resource can be saved.

To detail step 203 in FIG. 2, that the routing device routes the data according to the standard identity of the data specifically includes the following.

The routing device acquires the first mapping relationship table, where the first mapping relationship table is used to represent a mapping relationship between a standard identity and a DU. For example, a mapping relationship between a standard identity and a DU identity is represented, where the DU identity is used to uniquely identify a DU. For example, the DU identity may be a device serial number of a DU. The routing device routes each line of single-standard CPRI data according to the standard identity of each line of single-standard CPRI data and the first mapping relationship table. Exemplarily, the first mapping relationship table may be shown in the following table:

| Standard identity | Device serial number of DU |
|---|---|
| G | 1 |
| L | 2 |
| W | 2 |
| G | 2 |
| C | 3 |
| C | 4 |

Figure 6A:
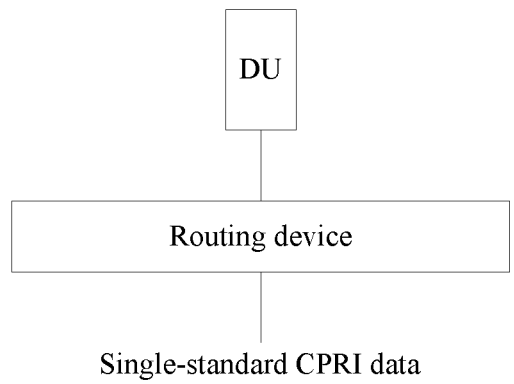
FIG. 6(*a*) to FIG. 6(*c*) are schematic diagrams of routing single-standard CPRI data to a DU in an embodiment.
Figure 6B:
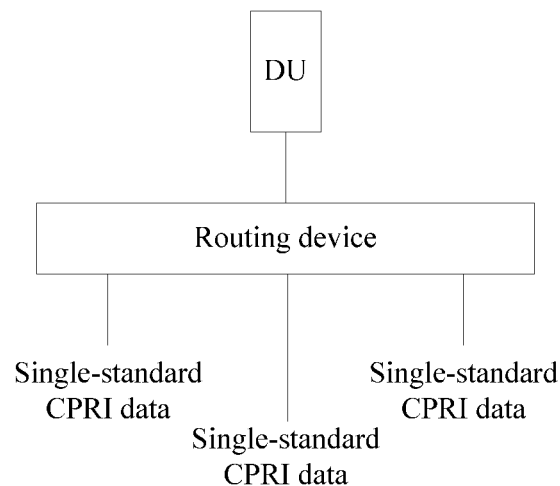
Figure 6C:
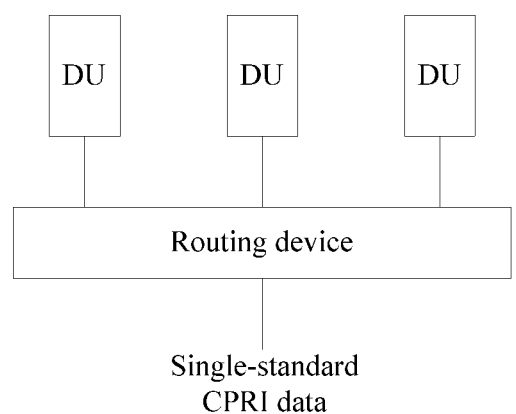

In the table above, one standard identity can be mapped to one device serial number of a DU, or a plurality of standard identities can be mapped to one device serial number of a DU, or one standard identity can be mapped to a plurality of device serial numbers of DUs. When the mapping relationship is one to one mapping, the routing path that the routing device selects for one line of single-standard CPRI data is shown in FIG. 6(*a*). When the mapping relationship is many to one, the routing path that the routing device selects for a line of single-standard CPRI data is shown in FIG. 6(*b*). When the mapping relationship is one to many, the routing path that the routing device selects for a line of single-standard CPRI data may be shown in FIG. 6(*c*).

It should be noted that, the DU included in the table above not only includes a single-standard DU that process data of a single standard, but also includes a multi-standard DU that processes data of multiple standards. For example, DU1 is a single-standard DU, and DU2 is a multi-standard DU. The routing device can also route a plurality of lines of single-standard CPRI data to the multi-standard DU, for example, as shown by the entries in row 2 and row 3 in the table above, which is not limited in the embodiment.

When a DU is a single-standard DU, each line of single-standard CPRI data is routed to a DU that processes the data of the standard. For example, the GSM single-standard data is routed to a single-standard DU that processes GSM data. Further, that each line of single-standard CPRI data is routed to a DU corresponding to the standard identity may also include that the single-standard CPRI data is routed to a multi-standard DU that can process the data of that standard. For example, a routing device routes GSM single-standard data to a multi-standard DU that can process both GSM data and LTE data, as long as the multi-standard DU at least can process GSM data. In an actual application, the first mapping relationship table can be set to determine whether to route GSM single-standard data to a single-standard DU that processes GSM data or a multi-standard DU that can process GSM data.

As a further expansion to the method shown in FIG. 2, in another preferred technical solution in the embodiment, before the sending the routed data to a DU corresponding to the standard identity of the routed data in step 204, the routing device may further combine at least two lines of single-standard CPRI data of the same standard identity into one line of combined single-standard CPRI data. A DU can serve as an aggregation resource pool of a plurality of base stations BBUs, and the data transmission rate on a CPRI interface of the DU is far greater than the data transmission rate of a CPRI interface on an RU (briefly referred to as data rate in the following). Because the number of RUs connected to a DU is large, data rates of CPRI data connected to the DU are also various. A plurality of lines of single-standard CPRI data with low data rates is combined into one line of combined single-standard data with a high data rate to be routed to a DU, and therefore, the types of data rates that the DU is to adapt to are reduced, thereby reducing the processing load of the DU, and also further reducing the number of CPRI interfaces used on the DU. Specifically, the routing device can aggregate a plurality of lines of single-standard CPRI data after performing step 203 and then perform step 204 to send the aggregated and combined single-standard CPRI data to a DU corresponding to the standard identity of the aggregated and combined single-standard CPRI data. Alternatively, the routing device can also aggregate a plurality of lines of single-standard CPRI data after performing step 202 and then perform step 203 to route the aggregated and combined single-standard CPRI data, and in the end perform step 204 to send the combined single-standard CPRI data to a DU corresponding to the standard identity of the combined single-standard CPRI data.

It should be noted that, the "aggregation" in the preferred solution does not correspond to the "deaggregation" above. The deaggregation refers to that one line of multi-standard CPRI data is deaggregated into a plurality of lines of single-standard CPRI data of different standards (or, different standard identities). The aggregation in this preferred solution refers to that a plurality of lines of deaggregated single-standard CPRI data with low data rates is combined into one line of single-standard CPRI data with a high low data rate, and the standard mode of the CPRI data before and after aggregation is not changed (still single-standard CPRI data). The "deaggregation" generally refers to that the multi-standard CPRI data sent by one CPRI interface is deaggregated, and the "aggregation" refers to that a plurality of lines of single-standard CPRI data with the same standard identity is combined, where "one line" may be one line of single-standard CPRI data obtained through "deaggregation", and may also be one line of single-standard CPRI data received from the CPRI interface.

Further, as an expansion to the method shown in FIG. 2, the routing device can further deaggregate and route multi-standard CPRI data sent by an RU according to a frequency band where the data belongs or the form of the RU. Specifically, the routing device can acquire a frequency band identity or an RU form identity in a CPRI data frame after receiving the multi-standard CPRI data, where the RU form identity includes a macro-RU and a micro-RU. The routing device can replace the standard identity in FIG. 2 with the frequency band identity or RU form identity to deaggregate and route the received multi-standard CPRI data. A person skilled in the art can deaggregate multi-standard CPRI data according to the frequency band or RU form according to the implementation manner shown in FIG. 2 in combination with a characteristic of the frequency band identity or RU form identity, which is not repeated in the embodiment any more.

With the data transmission method provided in the embodiment, when an RU sends data to a DU, a standard identity in the data can be acquired, the data can be routed according to the standard identity of the data, and then the routed data can be sent to a digital unit DU corresponding to the standard identity of the routed data. Compared with the prior art that a routing device only routes data that is sent by an RU and includes multiple standards to a DU according to a configured routing relationship between an RU and a DU, a DU can be prevented from transmitting data of a standard that the DU does process to another DU through a DU Switch, thereby reducing data exchange traffic in DU Cloud, and reducing a resource burden of the DU Cloud.

In addition, with the data transmission method provided in the embodiment, a plurality of lines of single-standard CPRI data of the same standard with low data rates can further be combined into one line of single-standard CPRI data with a high data rate to be sent to a DU, thereby reducing the types of data rates to adapt to on the DU, so as to reduce the processing load of the DU and saving a CPRI interface resource on the DU.

The method shown in FIG. 2 is described by using an example where an RU sends data to a DU, that is, an example of an uplink data direction. The embodiment is described in the following by using an example where a DU sends data to an RU, that is, an example of a downlink data direction.

Figure 7:
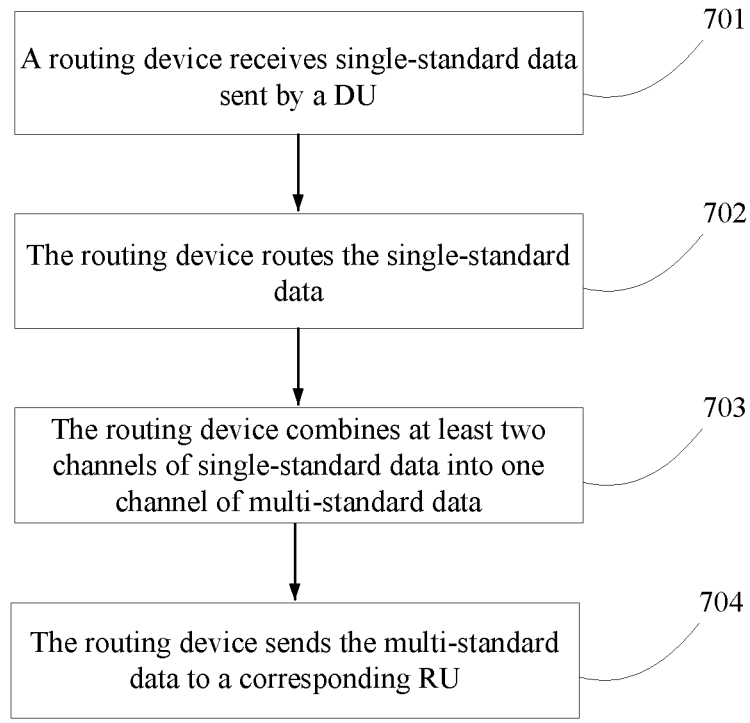
FIG. 7 is a flow chart of another data transmission method in an embodiment.

An embodiment provides a data transmission method, and as shown in FIG. 7, the method includes the following steps.

701: A routing device receives single-standard data sent by a DU.

After the routing device deaggregates multi-standard CPRI data sent by an RU into single-standard CPRI data and routes the data to the DU by using the method shown in FIG. 2, the DU processes the received single-standard CPRI data and then sends the processed single-standard CPRI data to the routing device.

702: The routing device routes the single-standard data.

After receiving the single-standard CPRI data, the routing device routes the single-standard CPRI data to a CPRI interface connected to the RU according to a preset rule.

703: The routing device combines at least two lines of single-standard data into one line of multi-standard data.

The routing device can combine single-standard CPRI data of different standard identities into one line of multi-standard CPRI data. For example, 3 lines of single-standard CPRI data, namely, GSM, LTE and WCDMA are combined into one line of multi-standard CPRI data carrying a GSM data frame, an LTE data frame and a WCDMA data frame, or 3 lines of single-standard CPRI data, namely, GSM, LTE and WCDMA, are combined into one line of multi-standard CPRI data carrying a GSM+LTE data frame and a WCDMA data frame, where the GSM+LTE data frame is a data frame carrying GSM data and LTE data. In an actual application, single-standard CPRI data of different standards can be combined according to system configuration.

704: The routing device sends the multi-standard data to a corresponding RU.

After combining is performed, the routing device sends the multi-standard CPRI data to a corresponding RU through CPRI interfaces corresponding to different RUs. For example, the routing device routes the multi-standard CPRI data to a CPRI interface 1, and then sends the multi-standard CPRI data to an RU connected to the CPRI interface 1 through the CPRI interface 1.

For a single-standard RU, the routing device can directly perform step 704 after performing step 702 and send single-standard CPRI data to a corresponding single-standard RU.

With the data transmission method provided in the embodiment, when a DU sends single-standard data to an RU, the single-standard data sent by the DU can be received, the received single-standard data can be routed, at least two lines of single-standard data can then be combined into one line of multi-standard data, and in the end the multi-standard data can be sent to a corresponding radio unit RU. Compared with the prior art that a routing device only routes single-standard data sent by a DU to a multi-standard RU according to a configured routing relationship between an RU and a DU, a multi-standard RU can receive multi-standard data correctly, and data transmission efficiency can be improved.

Further, as a detailed description and further expansion to the method shown in FIG. 7, an embodiment further provides a data transmission method, and the method includes the following.

Before step 702 is performed, the routing device may acquire a target identity of the single-standard CPRI data, where the target identity is used to identify a sending target of the single-standard CPRI data, that is, identify an RU receiving the single-standard CPRI data. The target identity may be an RU identity, for example, an RU serial number, or may also be an interface serial number of a CPRI interface connected to an RU. The function of the target identity is to identify an RU sending uplink CPRI data in an uplink direction (an RU sends CPRI data to a DU), so that downlink CPRI data is correctly sent in the downlink direction to the RU that previously sends uplink CPRI data.

For example, in an uplink direction, the routing device can acquire an RU identity or a serial number of a CPRI interface connected to an RU, and after uplink CPRI data sent by the RU is received, the RU identity (or the serial number of the CPRI interface receiving the uplink CPRI data) of the RU that sends the uplink CPRI data is added to the uplink CPRI data. The DU clarifies a mapping relationship between the CPRI data and the RU through the RU identity of the uplink CPRI data, sends downlink CPRI data to the RU, and the downlink CPRI data carries the target identity used to identify the RU receiving the downlink CPRI data. In the downlink direction, the routing device acquires the target identity used to identify the RU receiving the downlink CPRI data from the downlink CPRI data sent by the DU.

To detail step 702, the routing device can route the single-standard CPRI data according to the target identity in the single-standard CPRI data.

Alternatively, the routing device can further acquire a DU identity of the DU sending the single-standard CPRI data from the single-standard CPRI data, and then route the single-standard CPRI data to a corresponding RU according to a second mapping relationship table. Specifically, when the DU sends the single-standard CPRI data to the routing device, the DU can add its DU identity to the single-standard CPRI data, where the DU identity may be a DU serial number, which is used to uniquely identify the DU. After receiving the single-standard CPRI data, the routing device acquires the DU identity of the DU that sends the data, and the target identity of the data, and the routing device acquires the second mapping relationship table, where the second mapping relationship table is used to represent a mapping relationship between the DU identity and the target identity, for example, a mapping relationship between a DU1 and an RU1, where the routing device routes the single-standard CPRI data to an RU corresponding to the DU identity according to the DU identity and the second mapping relationship table carried in the single-standard CPRI data. Exemplarily, the second mapping relationship table may be shown in the following table:

| DU serial number | RU serial number |
|---|---|
| 1 | A |
| 2 | B |
| 3 | C |
| 3 | D |
| 4 | E |
| 5 | E |

In the table above, one DU serial number can be mapped to one RU serial number, or one DU serial number can be mapped to a plurality of RU serial numbers, or a plurality of DU serial numbers can be mapped to one RU serial number. For example, row 1 or row 2 in the table above represents that, the routing device routes single-standard CPRI data from a DU1 to an RUA, and routes single-standard CPRI data from a DU2 to an RUB. Row 3 and row 4 represent that the routing device routes single-standard CPRI data from a DU3 to an RUC and an RUD respectively. Row 5 and row 6 represent that the routing device routes two lines of single-standard CPRI data from a DU4 and a DU5 to an RUE.

To detail step 703 in FIG. 7, that the routing device combines at least two lines of single-standard data into one line of multi-standard data may specifically be that: the routing device combines at least two lines of single-standard CPRI data having a same target identity but different standard identities into one line of multi-standard CPRI data, where the standard identity is used to identify the standard type of one line of single-standard data. Generally, the routing device may receive a plurality of lines of single-standard CPRI data sent by a plurality of DUs through a plurality of CPRI interfaces, where at least two lines of single-standard CPRI data are sent to one same multi-standard RU. The routing device combines at least two lines of single-standard CPRI data with a same target identity but different standard identities into one line of multi-standard CPRI data to be sent to a multi-standard RU. For example, GSM single-standard data and LTE single-standard data are combined into one line of multi-standard CPRI data, where the specific combination manner may be, but is not limited to, combining the GSM data frame and the LTE data frame alternately, or insert a second preset number of LTE data frames by an interval of a first preset number of GSM data frames.

The basis on which the routing device combines a plurality of lines of single-standard CPRI data is that, the plurality of lines of single-standard CPRI data carries the same target identity.

To detail step 704 in FIG. 7, the routing device can send multi-standard CPRI data to a corresponding RU according to a target identity in the multi-standard CPRI data. For example, multi-standard CPRI data whose RU serial number is RU1 is sent to an RU1, or multi-standard CPRI data whose CPRI interface serial number is 23 is sent to an RU connected to a CPRI interface whose serial number is 23.

As a further expansion to the method shown in FIG. 7, in a preferred technical solution in the embodiment, the routing device can break one line of single-standard CPRI data sent by the DU down into at least two lines of single-standard sub-CPRI data. The DU serves as an aggregation resource pool of a plurality of base stations BBUs, and the data transmission rate on the CPRI interface of the DU is far greater than the data transmission rate of the CPRI interface on the RU (briefly referred to as data rate in the following). Because the number of RUs connected to the DU is large, data rates of the CPRI data connected to the DU are also various. One line of single-standard CPRI data with a high data rate is broken down into a plurality of lines of single-standard sub-CPRI data with low data rates in a data downlink direction and then step 703 is performed to combine the plurality of lines of single-standard sub-CPRI data with different standards corresponding to one same target identity, thereby reducing the types of data rates that the DU is to adapt to, reducing the processing load of the DU, and also further reducing the number of CPRI interfaces used on the DU.

In the embodiment, the routing device can break down each line of single-standard CPRI data after performing step 701 to receive the single-standard CPRI data, and then perform step 702 to route the plurality of broken down lines of single-standard sub-CPRI data respectively. The routing device can also break down the single-standard CPRI data after performing step 702 to route the single-standard CPRI data, and then perform step 703 to combine a plurality of lines of single-standard sub-CPRI data that has different standards and corresponds to one same target identity.

It should be noted that, the "breakdown" in the preferred solution and the "combining" are not opposite procedures. The so called combining is to combine a plurality of lines of single-standard data into one line of multi-standard CPRI data. The breakdown in this preferred solution is to break a line of single-standard CPRI data with a high data rate into a plurality of lines of single-standard sub-CPRI data with low data rates, and the standard mode of the CPRI data before and after aggregation is not changed (still single-standard CPRI data).

With the data transmission method provided in the embodiment, when a DU sends single-standard data to an RU, the single-standard data sent by the DU can be received, the received single-standard data can be routed, at least two lines of single-standard data can then be combined into one line of multi-standard data, and the multi-standard data can be sent to a corresponding radio unit RU in the end. Compared with the prior art that a routing device only routes single-standard data sent by a DU to a multi-standard RU according to a configured routing relationship between an RU and a DU, a multi-standard RU can receive multi-standard data correctly, and data transmission efficiency can be improved.

In addition, with the data transmission method provided in the embodiment, one line of single-standard CPRI data with a high data rate can be broken down into a plurality of lines of single-standard sub-CPRI data with low data rates to be sent to the DU, thereby reducing the types of data rates to adapt to on the DU, reducing the processing load of the DU, and saving a CPRI interface resource on the DU.

Figure 8:
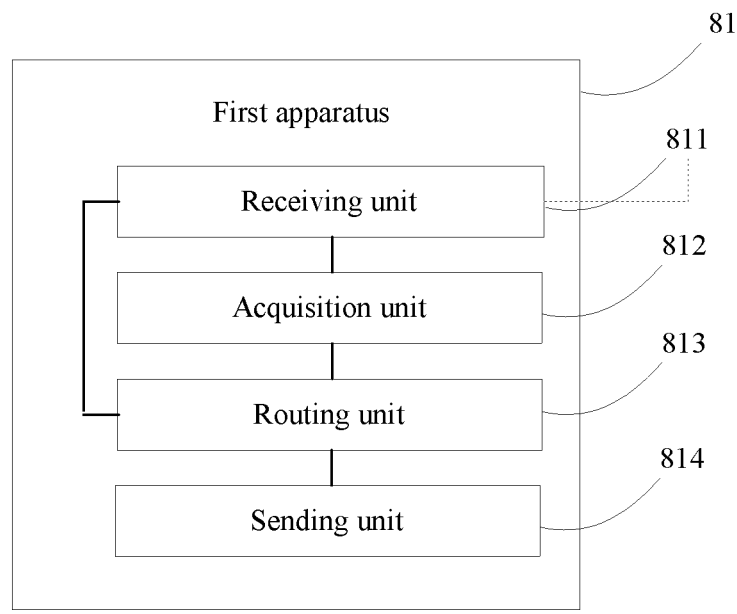
FIG. 8 is a first schematic structural diagram of a first apparatus in an embodiment.

Further, referring to the implementation of the method embodiment shown in FIG. 2, an embodiment provides a data transmission apparatus, where the apparatus is a first apparatus. As shown in FIG. 8, the first apparatus 81 includes: a receiving unit 811, an acquisition unit 812, a routing unit 813, and a sending unit 814.

The receiving unit 811 is configured to receive data sent by a radio unit RU.

The acquisition unit 802 is configured to acquire a standard identity of the data received by the receiving unit 811, where the standard identity is used to identify a standard type of the data.

The routing unit 813 is configured to route the data received by the receiving unit 811 according to the standard identity of the data acquired by the acquisition unit 812.

The sending unit 814 is configured to send the data routed by the routing unit 813 to a digital unit DU corresponding to the standard identity of the routed data.

Further, the receiving unit 811 is configured to receive the data that is divided into at least one line, and the acquisition unit 812 is specifically configured to acquire a standard identity of each data frame in each line of data received by the receiving unit 811, where when only one standard identity is acquired from the line of data, the line of data is a line of single-standard data, and when at least two standard identities are acquired from the line of data, the line of data is a line of multi-standard data.

Figure 9:
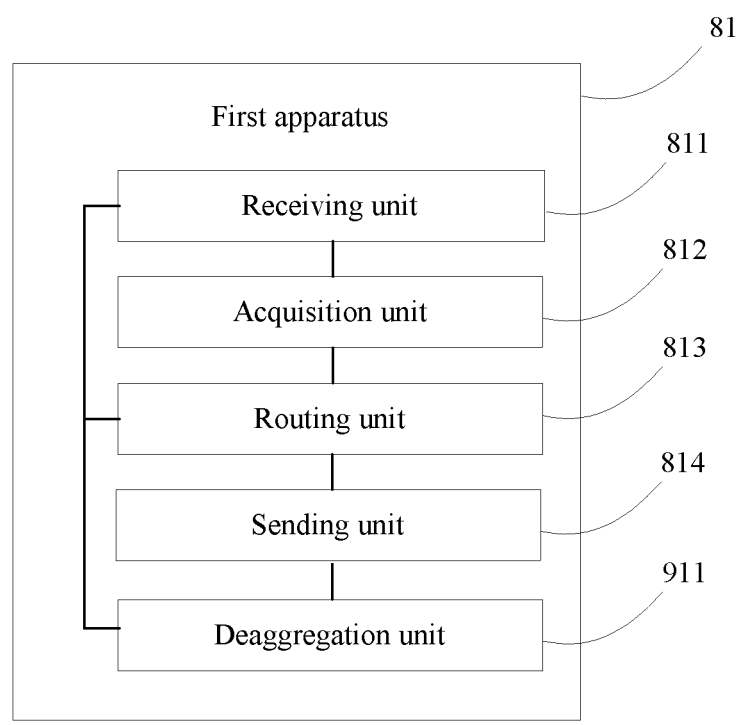
FIG. 9 is a second schematic structural diagram of a first apparatus in an embodiment.

Further, as shown in FIG. 9, the first apparatus 81 further includes a deaggregation unit 911.

The receiving unit 811 is configured to receive the data that is divided into at least one line.

The deaggregation unit 911 is configured to: before the routing unit 813 routes the data received by the receiving unit 811 according to the standard identity of the data acquired by the acquisition unit 812, when a standard identity of a data frame in one line of data included in the received data includes at least two standard identities, deaggregate the one line of data into at least two lines of single-standard data according to the at least two standard identities, where one of the standard identities corresponds to a line of single-standard data.

Figure 10:
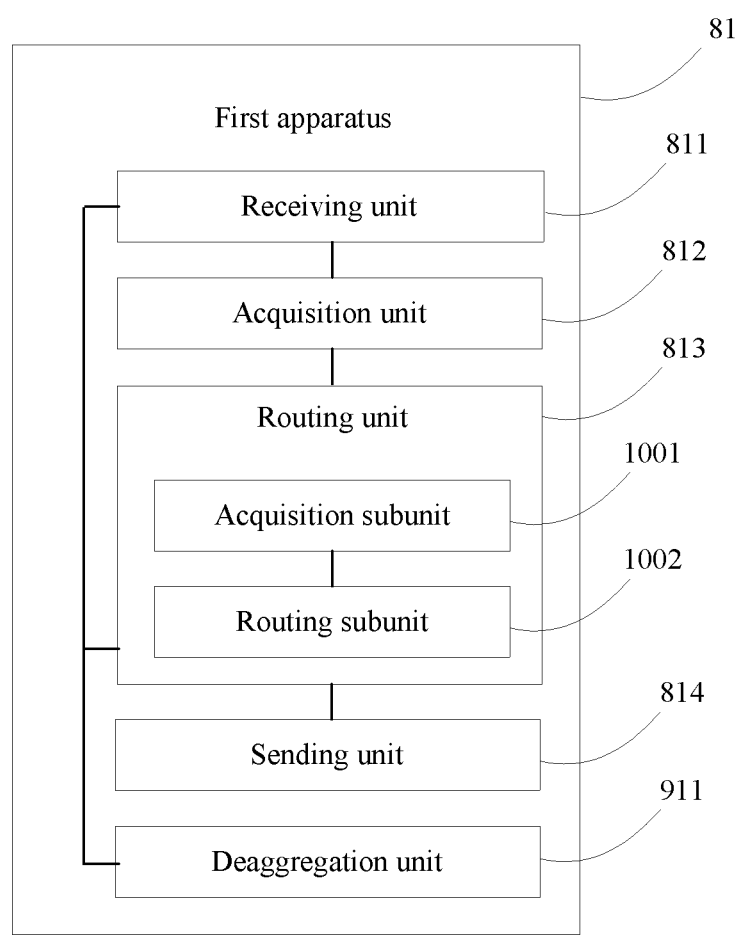
FIG. 10 is a third schematic structural diagram of a first apparatus in an embodiment.

Further, as shown in FIG. 10, the routing unit 813 includes an acquisition subunit 1001, configured to acquire a first mapping relationship table, where the first mapping relationship table is used to represent a mapping relationship between a standard identity and a DU; and a routing subunit 1002, configured to route the line of single-standard data according to the standard identity of the line of single-standard data and the first mapping relationship table acquired by the acquisition subunit 1001.

Figure 11:
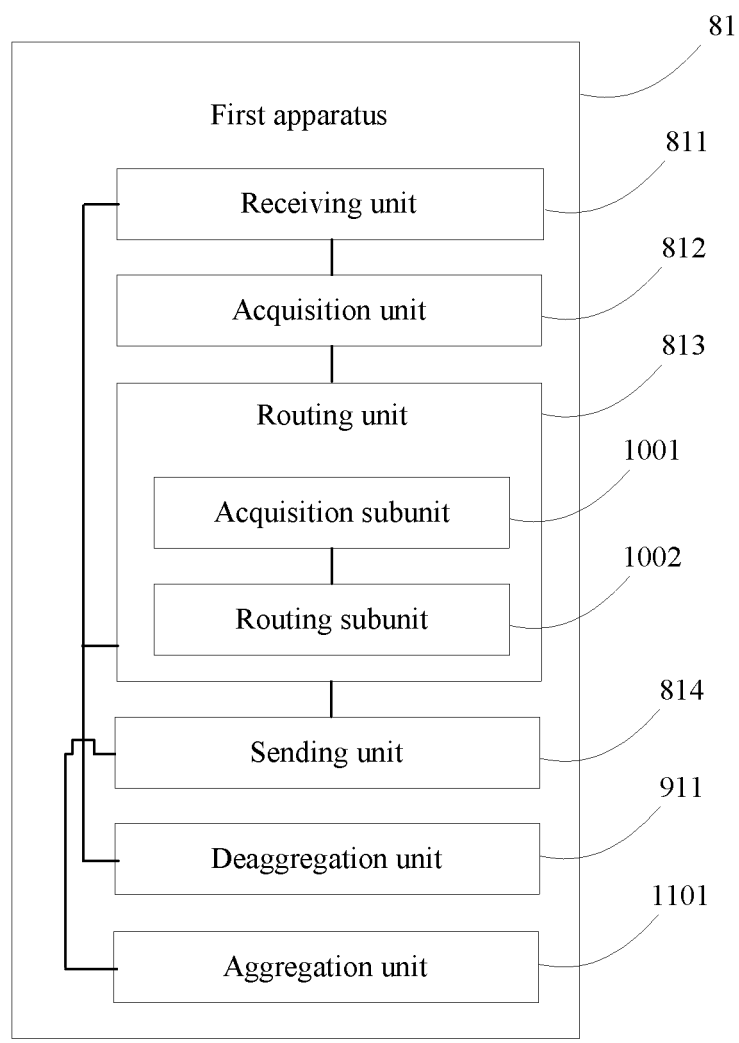
FIG. 11 is a fourth schematic structural diagram of a first apparatus in an embodiment.

Further, as shown in FIG. 11, the first apparatus 81 further includes an aggregation unit 1101.

The aggregation unit 1101 is configured to, before the sending unit 814 sends the data routed by the routing unit 813 to a DU corresponding to the standard identity of the routed data, aggregate at least two lines of single-standard data that have a same standard identity into one line of combined single-standard data, where a data transmission rate of the combined single-standard data is higher than a data transmission rate of one line of single-standard data.

The sending unit 814 is further configured to send the combined single-standard data aggregated by the aggregation unit 1101 to a DU corresponding to a standard identity of the combined single-standard data.

Further, the types of the standard identity acquired by the acquisition unit 812 includes: Global System for Mobile Communications (GSM), Time Division-Synchronous Code Division Multiple Access (TD-SCDMA), Code Division Multiple Access 2000 (CDMA2000), Wideband Code Division Multiple Access (WCDMA), Universal Mobile Telecommunications System (UMTS) or Long Term Evolution (LTE).

With the first apparatus provided in the embodiment, when an RU sends data to a DU, a standard identity in the data can be acquired, the data can be routed according to the standard identity of the data, and then the routed data can be sent to a digital unit DU corresponding to the standard identity of the routed data. Compared with the prior art that a routing device only routes data that is sent by an RU and includes multiple standards to the DU according to a configured routing relationship between an RU and a DU, a DU can be prevented from transmitting data of a standard that the DU does not process to another DU through a DU Switch, thereby reducing data exchange traffic in DU Cloud, and reducing a resource burden of the DU Cloud.

In addition, with the first apparatus provided in the embodiment, a plurality of lines of single-standard CPRI data of the same standard and low data rates can further be combined into one line of single-standard CPRI data with a high data rate to be sent to a DU, thereby reducing the types of data rates to adapt to on the DU, reducing the processing load of the DU, and saving a CPRI interface resource on the DU.

Figure 12:
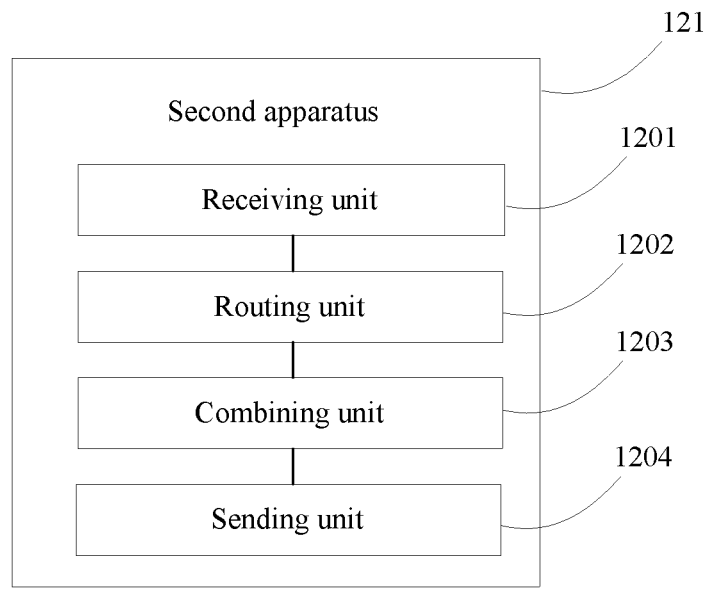
FIG. 12 is a first schematic structural diagram of a second apparatus in an embodiment.

Further, referring to the implementation of the method embodiment shown in FIG. 7, an embodiment provides a data transmission apparatus, where the apparatus is a second apparatus. As shown in FIG. 12, the second apparatus 121 includes: a receiving unit 1201, a routing unit 1202, a combining unit 1203, and a sending unit 1204.

The receiving unit 1201 is configured to receive single-standard data sent by a digital unit DU.

The routing unit 1202 is configured to route the single-standard data received by the receiving unit 1201.

The combining unit 1203 is configured to combine the at least two lines of single-standard data routed by the routing unit 1202 into one line of multi-standard data.

The sending unit 1204 is configured to send the multi-standard data combined by the combining unit 1203 to a corresponding radio unit RU.

Figure 13:
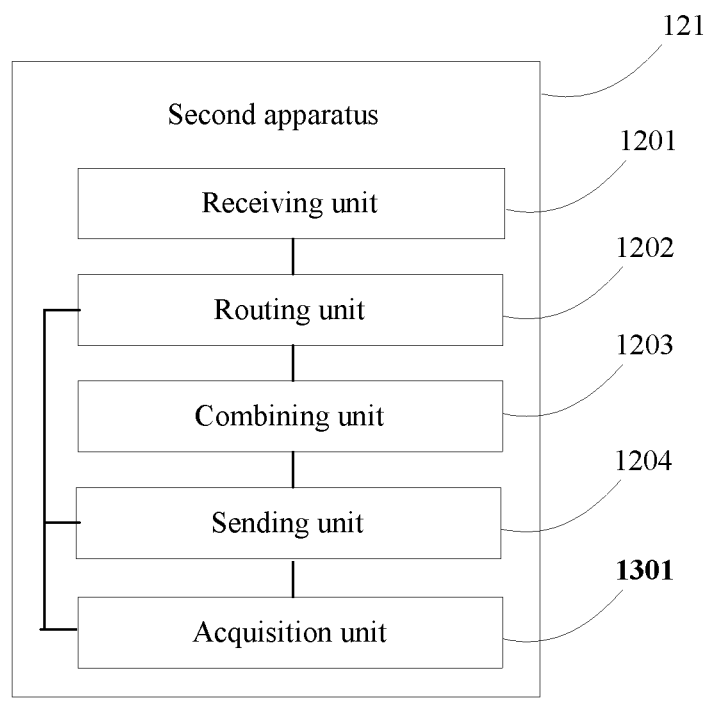
FIG. 13 is a second schematic structural diagram of a second apparatus in an embodiment.

Further, as shown in FIG. 13, the second apparatus 121 further includes: an acquisition unit 1301, configured to acquire a target identity of the single-standard data before the routing unit 1202 routes the single-standard data, where the target identity is used to identify an RU receiving the single-standard data.

Further, the routing unit 1202 is specifically configured to route the single-standard data according to the standard identity acquired by the acquisition unit 1301.

Further, the combining unit 1203 is specifically configured to combine at least two lines of single-standard data having a same target identity but different standard identities into one line of multi-standard data, where the standard identity is used to identify a standard type of a line of single-standard data.

Further, the routing unit 1204 is specifically configured to send the multi-standard data to a corresponding RU according to the standard identity acquired by the acquisition unit 1301.

Figure 14:
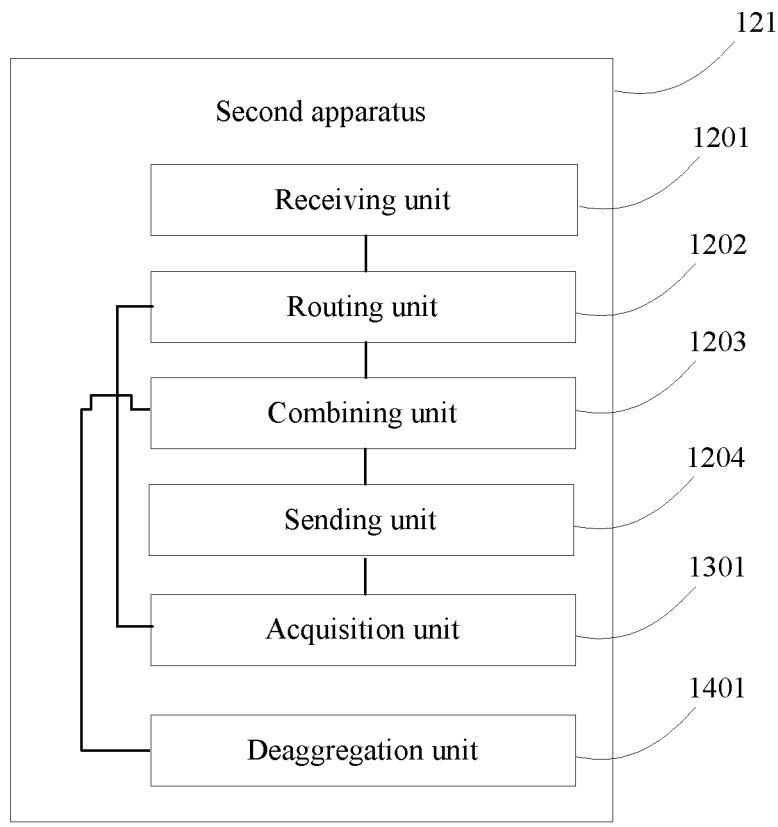
FIG. 14 is a third schematic structural diagram of a second apparatus in an embodiment.

Further, as shown in FIG. 14, the second apparatus 121 further includes: a breakdown unit 1401, configured to: before the combining unit 1203 combines at least two lines of single-standard data having a same target identity but different standard identities into one line of multi-standard data, break one line of single-standard data down into at least two lines of single-standard subdata, where a data rate of the single-standard subdata obtained through breakdown is lower than a data rate of the single-standard data before breakdown.

The combining unit 1203 is further configured to combine the at least two lines of single-standard subdata broken down by the breakdown unit 1401 into one line of multi-standard data.

Further, the target identity of the data acquired by the acquisition unit 1301 is an RU identity or a port number.

With the second apparatus provided in the embodiment, when a DU sends single-standard data to an RU, the single-standard data sent by the DU can be received, the received single-standard can be routed, at least two lines of single-standard data can then be combined into one line of multi-standard data, and the multi-standard data can be sent to a corresponding radio unit RU in the end. Compared with the prior art that a routing device only routes single-standard data sent by a DU to a multi-standard RU according to a configured routing relationship between an RU and a DU, a multi-standard RU can receive multi-standard data correctly, and data transmission efficiency can be improved.

In addition, the second apparatus provided in the embodiment can break one line of single-standard CPRI data with a high data rate down into a plurality of lines of single-standard sub-CPRI data with low data rates to be sent to an RU, thereby reducing the types of data rates to adapt to on the DU, reducing the processing load of the DU, and saving a CPRI interface resource on the DU.

Figure 15:
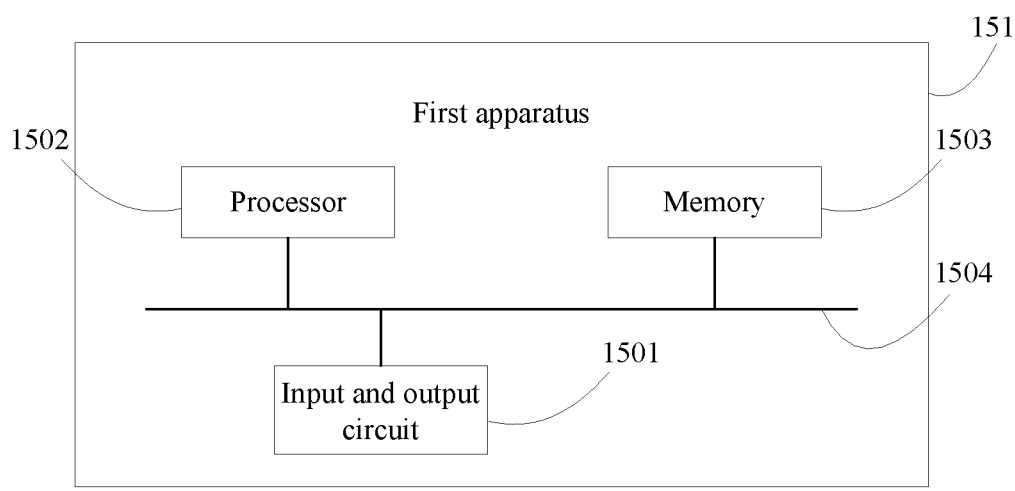
FIG. 15 is a fifth schematic structural diagram of a first apparatus in an embodiment.

Further, referring to the implementation of the method embodiment shown in FIG. 2, an embodiment provides a data transmission apparatus, where the apparatus is a first apparatus. As shown in FIG. 15, the first apparatus 151 includes: an input and output circuit 1501, a processor 1502, and a memory 1503, where the input and output circuit 1501, the processor 1502, and the memory 1503 communicate thorough a bus 1504.

The input and output circuit 1501 is configured to receive data sent by a radio unit RU.

The processor 1502 is configured to acquire a standard identity of the data received by the input and output circuit 1501, where the standard identity is used to identify a standard type of the data.

The memory 1503 is configured to store the standard identity acquired by the processor 1502.

The processor 1502 is further configured to route the data received by the input and output circuit 1501 according to the standard identity of the data stored by the memory 1503.

The input and output circuit 1501 is further configured to send the data routed by the processor 1502 to a digital unit DU corresponding to the standard identity of the routed data.

Further, the input and output circuit 1501 is configured to receive the data that is divided into at least one line.

The processor 1502 is specifically configured to acquire a standard identity of each data frame in each line of data received by the input and output circuit 1501, where when only one standard identity is acquired from the line of data, the line of data is a line of single-standard data, and when at least two standard identities are acquired from the line of data, the line of data is a line of multi-standard data.

Further, the input and output circuit 1501 is configured to receive the data that is divided into at least one line.

The processor 1502 is further configured to: before the data received by the receiving unit is routed according to the standard identity of the data acquired by the acquisition unit, and when a standard identity of a data frame in one line of data included in the received data includes at least two standard identities, deaggregate the one line of data into at least two lines of single-standard data according to the at least two standard identities, where one of the standard identities corresponds to a line of single-standard data.

Further, the memory 1503 is further configured to store a first mapping relationship table, where the first mapping relationship table is used to represent a mapping relationship between a standard identity and a DU.

The processor 1502 is further configured to acquire the first mapping relationship table, and route the line of single-standard data according to the standard identity of the line of single-standard data and the first mapping relationship table.

The processor 1502 is configured to: before the input and output circuit 1501 sends the data routed by the processor 1502 to a DU corresponding to the standard identity of the routed data, aggregate at least two lines of single-standard data that have a same standard identity into one line of combined single-standard data, where a data transmission rate of the combined single-standard data is higher than a data transmission rate of one line of single-standard data.

The input and output circuit 1501 is further configured to send the combined single-standard data aggregated by the processor 1502 to a DU corresponding to a standard identity of the combined single-standard data.

Further, the types of the standard identity acquired by the processor 1502 include: Global System for Mobile Communications (GSM), Time Division-Synchronous Code Division Multiple Access (TD-SCDMA), Code Division Multiple Access 2000 (CDMA2000), Wideband Code Division Multiple Access (WCDMA), Universal Mobile Telecommunications System (UMTS) or Long Term Evolution (LTE).

With the first apparatus provided in the embodiment, when an RU sends data to a DU, a standard identity in the data can be acquired, the data can be routed according to the standard identity of the data, and then the routed data can be sent to a digital unit DU corresponding to the standard identity of the routed data. Compared with the prior art that a routing device only routes data that is sent by an RU and includes multiple standards to a DU according to a configured routing relationship between an RU and a DU, the DU can be prevented from transmitting data of a standard that the DU does not process to another DU through a DU Switch, thereby reducing data exchange traffic in DU Cloud, and reducing a resource burden of the DU Cloud.

In addition, with the first apparatus provided in the embodiment, a plurality of lines of single-standard CPRI data of the same standard and low data rates can further be combined into one line of single-standard CPRI data with a high data rate to be sent to the DU, thereby reducing the types of data rates to adapt to on the DU, reducing the processing load of the DU, and saving a CPRI interface resource on the DU.

Figure 16:
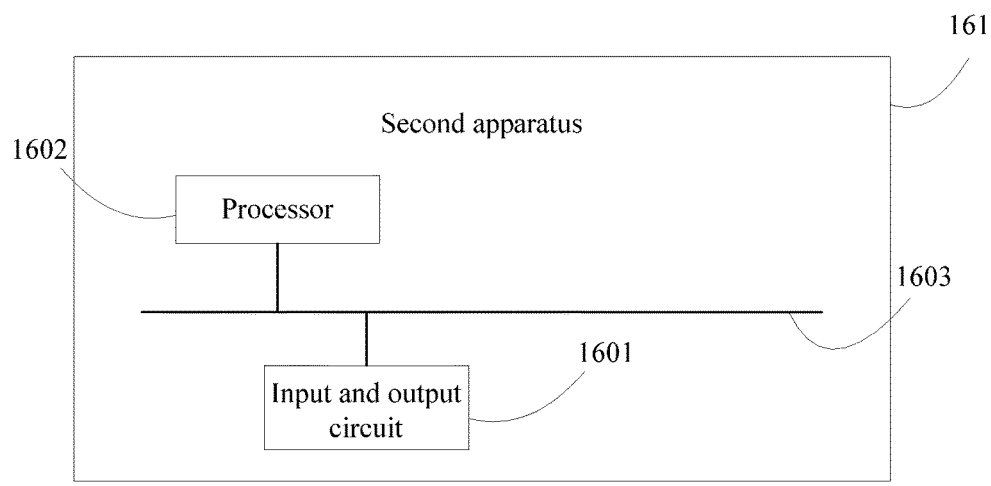
FIG. 16 is a fourth schematic structural diagram of a second apparatus in an embodiment.

Further, referring to the implementation of the method embodiment shown in FIG. 7, an embodiment provides a data transmission apparatus, where the apparatus is a second apparatus. As shown in FIG. 16, the second apparatus 161 includes: an input and output circuit 1601 and a processor 1602, where the input and output circuit 1601 and the processor 1602 communicate thorough a bus 1603.

The input and output circuit 1601 is configured to receive single-standard data sent by a digital unit DU.

The processor 1602 is configured to route the single-standard data received by the input and output circuit 1601.

The processor 1602 is further configured to combine at least two lines of the routed single-standard data into one line of multi-standard data.

The input and output circuit 1601 is further configured to send the multi-standard data combined by the processor 1602 to a corresponding radio unit RU.

Further, the processor 602 is further configured to acquire a target identity of the single-standard data before the single-standard data is routed, where the target identity is used to identify an RU receiving the single-standard data.

Figure 17:
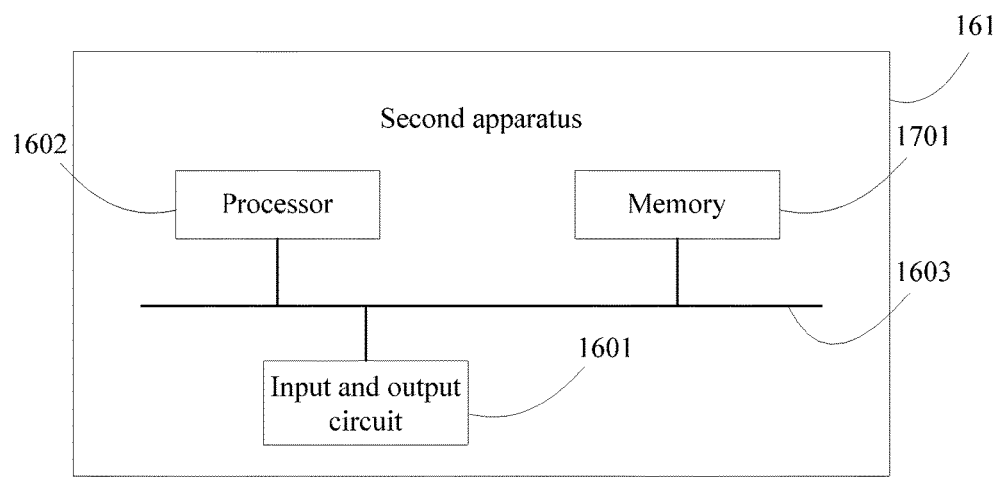
FIG. 17 is a fifth schematic structural diagram of a second apparatus in an embodiment.

As shown in FIG. 17, the second apparatus 161 further includes a memory 1701, where the memory 1701 communicates with the input and output circuit 1601 and the processor 1602 through a bus 1603.

The memory 1701 is configured to store the standard identity acquired by the processor 1602.

Further, the processor 1602 is specifically configured to route the single-standard data according to the target identity stored by the processor 1701.

Further, the processor 1602 is specifically configured to combine at least two lines of single-standard data having a same target identity but different standard identities into one line of multi-standard data, where the standard identity is used to identify a standard type of a line of single-standard data.

Further, the input and output circuit 1601 is specifically configured to send the multi-standard data to a corresponding RU according to the target identity stored by the memory 1701.

Further, the processor 1602 is further configured to: before at least two lines of single-standard data having a same target identity but different standard identities are combined into one line of multi-standard data, break one line of single-standard data down into at least two lines of single-standard subdata, where a data rate of the single-standard subdata obtained through breakdown is lower than a data rate of the single-standard data before breakdown.

The processor 1602 is further configured to combine the at least two lines of single-standard subdata after breakdown into one line of multi-standard data.

Further, the target identity of the data acquired by the processor 1602 is an RU identity or a port number.

With the second apparatus provided in the embodiment, when a DU sends single-standard data to an RU, the single-standard data sent by the DU can be received, the received single-standard can be routed, at least two lines of single-standard data can then be combined into one line of multi-standard data, and the multi-standard data can be sent to a corresponding radio unit RU in the end. Compared with the prior art that a routing device only routes single-standard data sent by a DU to a multi-standard RU according to a configured routing relationship between an RU and a DU, a multi-standard RU can receive multi-standard data correctly, and data transmission efficiency can be improved.

In addition, the second apparatus provided in the embodiment can break one line of single-standard CPRI data with a high data rate down into a plurality of lines of single-standard CPRI data with low data rates to be sent to an RU, thereby reducing the types of data rates to adapt to on the DU, reducing the processing load of the DU, and saving a CPRI interface resource on the DU.

Figure 18:
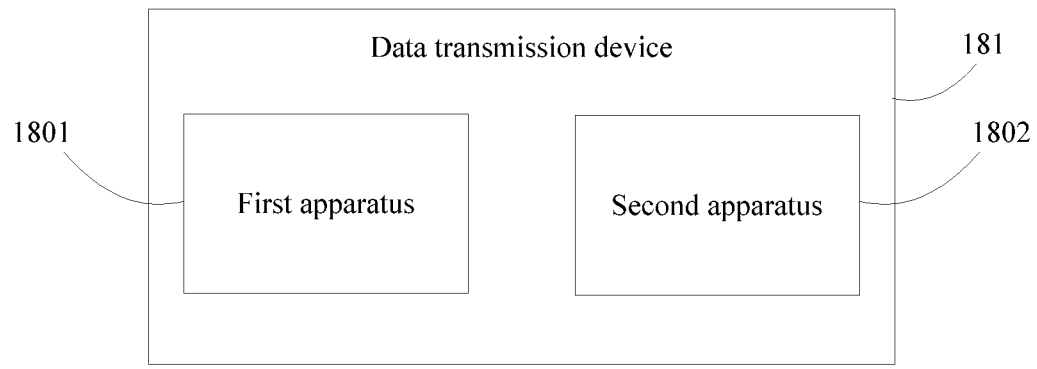
FIG. 18 is a first schematic structural diagram of a data transmission device in an embodiment.

Further, referring to a first apparatus 81 shown in any one of FIG. 8 to FIG. 11 and/or a second apparatus 121 shown in any one of FIG. 12 to FIG. 14, an embodiment further provides a data transmission device. As shown in FIG. 18, the device 181 includes: a first apparatus 1801 shown in any one of FIG. 8 to FIG. 11 and/or a second apparatus 1802 shown in any one of FIG. 12 to FIG. 14.

The first apparatus 1801 is configured to receive data sent by a radio unit RU, acquire a standard identity of the data, where the standard identity is used to identify a standard type of the data, route the data according to the standard identity of the data, and send the routed data to a digital unit DU corresponding to the standard identity of the routed data.

The second apparatus 1802 is configured to receive single-standard data sent by a digital unit DU, route the single-standard data, combine at least two lines of single-standard data into one line of multi-standard data, and send the multi-standard data to a corresponding radio unit RU.

With the data transmission apparatus provided by the embodiment, when an RU sends data to a DU, a standard identity in the data can be acquired, the data can be routed according to the standard identity of the data, and then the routed data can be sent to a digital unit DU corresponding to the standard identity of the routed data. When a DU sends single-standard data to an RU, the single-standard data sent by the DU can be received, the received single-standard data can be routed, at least two lines of single-standard data can then be combined into one line of multi-standard data, and the multi-standard data can be sent to the corresponding radio unit RU in the end. Compared with the prior art that a routing device only sends data that is sent by an RU and includes multiple standards to a DU according to a configured routing relationship between an RU and a DU, the DU can be prevented from transmitting data of a standard that the DU does not process to another DU through a DU Switch, thereby reducing data exchange traffic in DU Cloud, and reducing a resource burden of the DU Cloud. In addition, compared with the prior art that a routing device only routes single-standard data sent by a DU to a multi-standard RU according to a configured routing relationship between an RU and a DU, a multi-standard RU can receive multi-standard data correctly, and data transmission efficiency can be improved.

Figure 19:
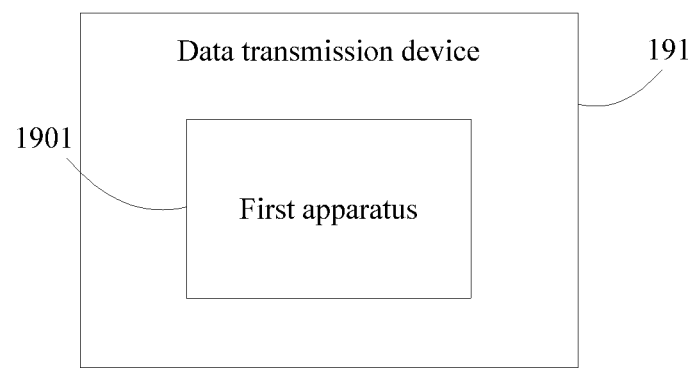
FIG. 19 is a second schematic structural diagram of a data transmission device in an embodiment.

Further, referring to the first apparatus 151 shown in FIG. 15, an embodiment further provides a data transmission apparatus. As shown in FIG. 19, the device 191 includes: a first apparatus 1901 shown in FIG. 15, configured to receive data sent by a radio unit RU, acquire a standard identity of the data, where the standard identity is used to identify a standard type of the data, route the data according to the standard identity of the data, and send the routed data to a digital unit DU corresponding to the standard identity of the routed data.

With the data transmission device provided in the embodiment, when an RU sends data to a DU, a standard identity in the data can be acquired, the data can be routed according to the standard identity of the data, and then the routed data can be sent to a digital unit DU corresponding to the standard identity of the routed data. Compared with the prior art that a routing device only routes data that is sent by an RU and includes multiple standards to a DU according to a configured routing relationship between an RU and a DU, the DU can be prevented from transmitting data of a standard that the DU does not process to another DU through a DU Switch, thereby reducing data exchange traffic in DU Cloud, and reducing a resource burden of the DU Cloud.

Figure 20:
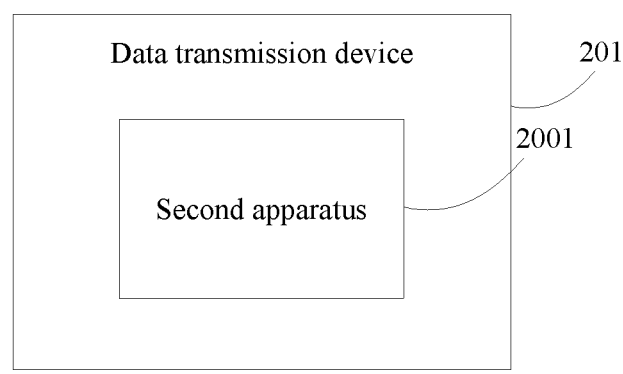
FIG. 20 is a third schematic structural diagram of a data transmission device in an embodiment.

Further, referring to the second apparatus 161 shown in FIG. 16 or FIG. 17, an embodiment further provides a data transmission device. As shown in FIG. 20, the device 201 includes: a second apparatus 2001 shown in FIG. 16 or FIG. 17, configured to receive single-standard data sent by a digital unit DU, route the single-standard data, combine at least two lines of single-standard data into one line of multi-standard data, and send the multi-standard data to a corresponding radio unit RU.

With the data transmission device provided in the embodiment, when a DU sends single-standard data to an RU, the single-standard data sent by the DU can be received, the received single-standard data can be routed, at least two lines of single-standard data can then be combined into one line of multi-standard data, and the multi-standard data can be sent to a corresponding radio unit RU in the end. Compared with the prior art that a routing device only routes single-standard data sent by a DU to a multi-standard RU according to a configured routing relationship between an RU and a DU, a multi-standard RU can receive multi-standard data correctly, and data transmission efficiency can be improved.

Figure 21:
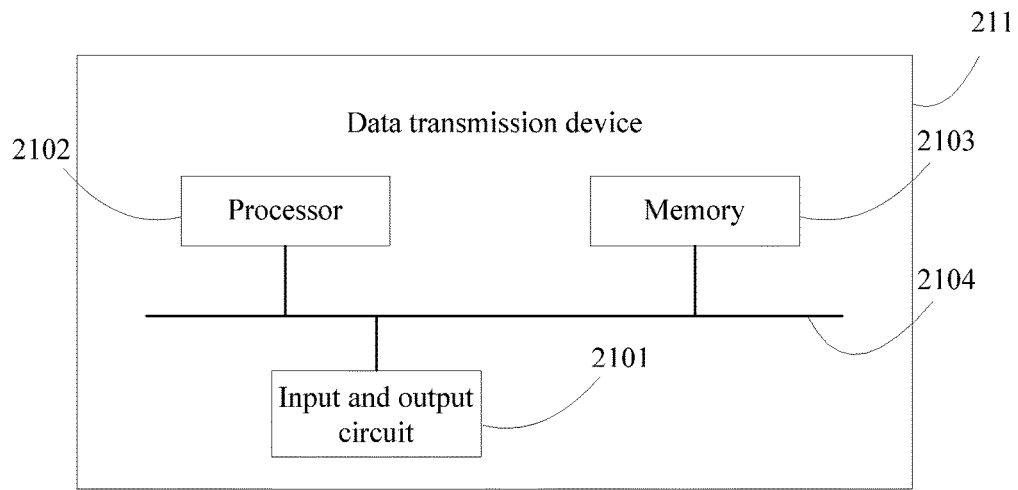
FIG. 21 is a fourth schematic structural diagram of a data transmission device in an embodiment.

Further, an embodiment provides a data transmission device. As shown in FIG. 21, the device 211 includes: an input and output circuit 2101, a processor 2102, and a memory 2013, where the input and output circuit 2101, the processor 2102, and the memory 2103 communicate thorough a bus 2104. Here:

The input and output circuit 2101 is configured to receive single-standard data sent by a digital unit DU.

The processor 2102 is configured to route the single-standard data received by the input and output circuit 2101.

The processor 2102 is further configured to combine at least two lines of the routed single-standard data into one line of multi-standard data.

The input and output circuit 2101 is further configured to send the multi-standard data combined by the processor 2102 to a corresponding radio unit RU.

The input and output circuit 2101 is further configured to receive data sent by a radio unit RU.

The processor 2102 is further configured to acquire a standard identity of data sent by an RU and received by the input and output circuit 2101, where the standard identity is used to identify a standard type of the data.

The memory 2103 is configured to store the standard identity acquired by the processor 2102.

The processor 2102 is further configured to route the data sent by the RU and received by the input and output circuit 2101 according to the standard identity of the data stored by the memory 2103.

The data transmission device provided in the embodiment may be seen as a combination of the first apparatus 151 shown in FIG. 15 and the second apparatus 161 shown in FIG. 16, or may be seen as a combination of the first apparatus 151 shown in FIG. 15 and the second apparatus 161 shown in FIG. 17. Corresponding structures of the two apparatuses are no longer separated but become one same structure in hardware structure. Therefore, for the data transmission device provided in the embodiment, reference may be made to the specific description of the first apparatus 151 shown in FIG. 15 and the second apparatus 161 shown in FIG. 16 or FIG. 17, which is not described herein again.

With the data transmission apparatus provided by the embodiment, when an RU sends data to a DU, a standard identity in the data can be acquired, the data can be routed according to the standard identity of the data, and then the routed data can be sent to a digital unit DU corresponding to the standard identity of the routed data. When a DU sends single-standard data to an RU, the single-standard data sent by the DU can be received, the received single-standard data can be routed, at least two lines of single-standard data can then be combined into one line of multi-standard data, and the multi-standard data can be sent to a corresponding radio unit RU in the end. Compared with the prior art that a routing device only routes data that is sent by an RU and includes multiple standards to a DU according to a configured routing relationship between an RU and a DU, the DU can be prevented from transmitting data of a standard that the DU does not process to another DU through a DU Switch, thereby reducing data exchange traffic in DU Cloud, and reducing a resource burden of the DU Cloud. In addition, compared with the prior art that a routing device only routes single-standard data sent by a DU to a multi-standard RU according to a configured routing relationship between an RU and a DU, a multi-standard RU can receive multi-standard data correctly, and data transmission efficiency can be improved.

Figure 22:
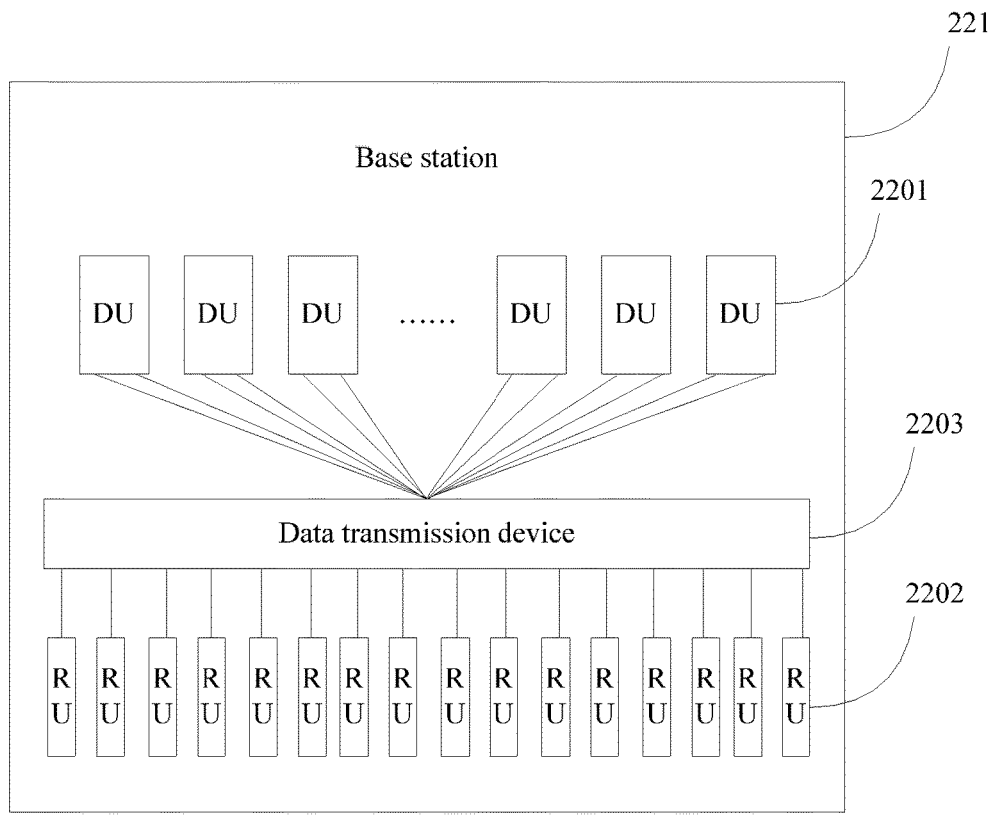
FIG. 22 is a schematic structural diagram of a base station in an embodiment.

Further, an embodiment further provides a base station. As shown in FIG. 22, the base station 221 includes: an RU 2201, a DU 2202 and a data transmission device 2203 shown in any one of FIG. 18 to FIG. 21.

The data transmission device 2203 is independent from the RU 2201 and the DU 2202, and the data transmission device 2203 establishes communication with the RU 2201 and the DU 2102 respectively.

Alternatively, the data transmission device 2203 is integrated in the DU 2202, and establishes communication with the RU 2201.

Alternatively, the data transmission device 2203 is integrated in the RU 2201, and establishes communication with the DU 2202.

Alternatively, a part of the data transmission device 2203 is integrated in the DU 2202 and a part is integrated in the RU 2201 according to an actual need, where the two parts establish communication.

The RU 2201 is configured to send or receive multi-standard CPRI data, the DU 2202 is configured to process single-standard CPRI data, or the DU 2202 is configured to process multi-standard CPRI data.

For the structure and application of the device 2203, reference may be made to the description of the embodiment corresponding to any one of FIG. 18 to FIG. 21, which is not described herein any more.

With the base station provided by the embodiment, when an RU sends data to a DU, a standard identity in the data can be acquired, the data can be routed according to the standard identity of the data, and then the routed data can be sent to a digital unit DU corresponding to the standard identity of the routed data. When a DU sends single-standard data to an RU, the single-standard data sent by the DU can be received, the received single-standard data can be routed, at least two lines of single-standard data can then be combined into one line of multi-standard data, and the multi-standard data can be sent to a corresponding radio unit RU in the end. Compared with the prior art that a routing device only routes data that is sent by an RU and includes multiple standards to a DU according to a configured routing relationship between an RU and a DU, the DU can be prevented from transmitting data of a standard that the DU does not process to another DU through a DU Switch, thereby reducing data exchange traffic in DU Cloud, and reducing a resource burden of the DU Cloud. In addition, compared with the prior art that a routing device only routes single-standard data sent by a DU to a multi-standard RU according to a configured routing relationship between an RU and a DU, a multi-standard RU can receive multi-standard data correctly, and data transmission efficiency can be improved.

In the embodiment, the first apparatus 81 shown in any one of FIG. 8 to FIG. 11 can be configured to implement the method shown in FIG. 2; the second apparatus 121 shown in any one of FIG. 12 to FIG. 14 can be configured to implement the method shown in FIG. 7; the first apparatus 151 shown in FIG. 15 can be configured to implement the method shown in FIG. 2; the second apparatus 161 shown in FIG. 16 or FIG. 17 can be configured to implement the method shown in FIG. 7; the device 181 shown in FIG. 18 includes the first apparatus shown in any one of FIG. 8 to FIG. 11 and/or the second apparatus shown in any one of FIG. 12 to FIG. 14, and can be configured to implement the method shown in FIG. 2 and/or FIG. 7; the device 191 shown in FIG. 19 includes the first apparatus shown in FIG. 15, and can be configured to implement the method shown in FIG. 2; the device 201 shown in FIG. 20 includes the second apparatus shown in FIG. 16 or FIG. 17, and can be configured to implement the method shown in FIG. 7; the device 211 shown in FIG. 21 corresponds to the first apparatus shown in FIG. 15 and the second apparatus shown in FIG. 16 or FIG. 17, and can be configured to implement the method shown in FIG. 2 and FIG. 7; the base station 221 shown in FIG. 22 includes the device shown in any one of FIG. 18 to FIG. 21, and can be configured to implement the method shown in FIG. 2 and/or FIG. 7, which are not described herein any more.

It can be clearly understood by a person skilled in the art that, for the purpose of convenient and brief description, division of the foregoing function modules is used as an example for description. In an actual application, the foregoing functions can be allocated to different functional modules for implementation according to the need, that is, the internal structure of the device is divided into different functional modules to implement all or a part of the functions described above. For a detailed working process of the foregoing systems, apparatuses and units, reference may be made to the corresponding process in the method embodiments, and the details are not described herein again.

In the several embodiments provided in the present application, it should be understood that the disclosed systems, apparatuses, and methods may be implemented in other manners. For example, the described apparatus embodiments are merely exemplary. For example, the division of the modules or units is merely division in logical function and may be other division manners in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments may be integrated into one processing unit, or each of the units may exist alone physically, or two or more units may be integrated into one unit. The integrated unit may be implemented in the form of hardware, or may be implemented in the form of a software functional unit.

When the integrated units are implemented in the form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium, and includes several instructions for instructing a computer device (which may be a personal computer, a server, a network device, or the like) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the scope of the claims of the present invention.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving first data sent by a first radio unit (RU);
   acquiring a first standard identity of a data frame of the first data, wherein the first standard identity identifies a first standard type of the first data;
   routing the first data according to the first standard identity of the data frame of the first data by selecting a first digital unit (DU), from a plurality of digital units (DUs), to which the first data will be routed, wherein the first DU is selected according to the first standard identity, and wherein the first DU corresponds to the first standard identity of the routed first data;
   sending the routed first data to the first DU corresponding to the first standard identity;
   receiving second data sent by a second RU;
   acquiring a second standard identity of a data frame of the second data, wherein the second standard identity identifies a second standard type of the second data, wherein the first standard type is different than the second standard type, and wherein the first standard identity is different than the second standard identity;
   routing the second data according to the second standard identity by selecting a second DU, from the plurality of DUs, to which the second data will be routed, wherein the second DU is selected according to the second standard identity, and wherein the second DU corresponds to the second standard identity; and
   sending the routed second data to the second DU corresponding to the second standard identity of the routed second data, wherein the second DU is different from the first DU.

2. The method according to claim 1, wherein the first data is divided into one or more lines for receiving, and wherein acquiring the first standard identity of the data frame of the first data comprises:
   acquiring a standard identity of each data frame in each line of the one or more lines of data;
   determining that a line of data is a line of single-standard data in response to each standard identity that is acquired from the line of data being the first standard identity; and
   determining that a line of data is a line of multi-standard data in response to two or more standard identities that are acquired from the line of data including the first standard identity and a third standard identity, the third standard identity corresponding to a third standard type, the third standard type being different than the first standard type.

3. The method according to claim 2, the method further comprising, in response to determining that a line of data is a line of multi-standard data, de-aggregating the line of data into two or more lines of single-standard data according to the two or more standard identities, wherein one of the two or more standard identities corresponds to a line of single-standard data.

4. The method according to claim 2, wherein the routing the first data according to the first standard identity of the data frame of the first data by selecting the first DU, from the plurality of DUs, to which the first data will be routed comprises:
   acquiring a first mapping relationship table, wherein the first mapping relationship table is used to represent a mapping relationship between the first standard identity and the first DU; and
   selecting the first DU to which the line of single-standard data will be routed according to the first standard identity of the line of single-standard data and the first mapping relationship table.

5. The method according to claim 2, wherein before the sending the routed first data to the first DU, the method further comprises:
   aggregating two or more lines of single-standard data that have the first standard identity into one line of combined single-standard data, wherein a data transmission rate of the combined single-standard data is higher than a data transmission rate of one line of single-standard data; and
   wherein the sending the routed first data to the first DU comprises sending the combined single-standard data to the first DU corresponding to the first standard identity of the combined single-standard data.

6. A method, comprising:
   receiving, by a device, first single-standard data sent by a first digital unit (DU) of a plurality of digital units (DUs), wherein the device is connected to each of the plurality of DUs;
   routing the first single-standard data by selecting a first radio unit (RU) of a plurality of radio units (RUs) to which to route the first single-standard data, wherein the device is connected to each of the plurality of RUs;
   receiving second single-standard data sent by a second DU of the plurality of DUs, wherein the second single-standard data has a standard type that is different from a standard type of the first single-standard data;
   routing the second single-standard data by selecting a second RU of the plurality of RUs to which to route the second single-standard data;
   in response to determining that the first RU and the second RU are the same RU, combining a first line of the first single-standard data and a first line of the second single-standard data into one line of multi-standard data, and sending the one line of multi-standard data to the first RU; and
   in response to determining that the first RU and the second RU are different, sending the first single-standard data to the first RU and sending the second single-standard data to the second RU, wherein the first single-standard data and the second single-standard data are sent over different communication paths.

7. The method according to claim 6, wherein a target identity of the one line of multi-standard data is an (RU) identity or a port number.

8. An apparatus, comprising:
   an input and output circuit, configured to receive first data sent by a first radio unit (RU);
   a processor, configured to acquire a first standard identity of a data frame of the first data received by the input and output circuit, wherein the first standard identity is used to identify a first standard type of the first data; and
   a memory, configured to store the first standard identity acquired by the processor;
   wherein the processor is further configured to route the first data received by the input and output circuit by selecting a first digital unit (DU) of a plurality of digital units (DUs) to which to route the first data, where the first DU is selected according to the first standard identity of the data frame of the first data stored by the memory, and wherein the first DU corresponds to the first standard identity;

wherein the input and output circuit is further configured to send the first data routed by the processor to the first DU corresponding to the first standard identity of the routed first data;

wherein the input and output circuit is further configured to receive second data sent by a second RU;

wherein the processor is further configured to acquire a second standard identity of a data frame of the second data received by the input and output circuit, wherein the second standard identity is used to identify a second standard type of the second data, and wherein the first standard type is different than the second standard type;

wherein the memory is further configured to store the second standard identity acquired by the processor;

wherein the processor is further configured to route the second data received by the input and output circuit by selecting a second DU of the plurality of DUs to which to route the second data, wherein the second DU is selected according to the second standard identity of the data frame of the second data stored by the memory, and wherein the second DU corresponds to the second standard identity;

wherein the input and output circuit is further configured to send the second data routed by the processor to the second DU corresponding to the second standard identity; and wherein the input and output circuit, the processor, and the memory communicate through a bus.

9. The apparatus according to claim 8, wherein:
the first data received by the input and output circuit is divided into one or more lines; and
the processor is further configured to:
acquire a standard identity of each data frame in each line of the one or more lines of data received by the input and output circuit;
determine a line of data is a line of single-standard data in response to the first standard identity being acquired from each data frame in the line of data; and
determine a line of data is a line of multi-standard data in response to two or more standard identities that are acquired from the line of data including the first standard identity and a third standard identity, the third standard identity corresponding to a third standard type, the third standard type being different than the first standard type.

10. The apparatus according to claim 9, wherein:
the first data received by the input and output circuit is divided into one or more lines; and
the processor is further configured to:
de-aggregate, in response to determining that a line in the one or more lines of data comprises two or more standard identities, the line of data into two or more lines of single-standard data according to the two or more standard identities, wherein one of the two or more standard identities corresponds to a line of single-standard data.

11. The apparatus according to claim 9, wherein:
the memory is further configured to store a first mapping relationship table, the first mapping relationship table representing a mapping relationship between the first standard identity and the first DU; and
the processor is further configured to acquire the first mapping relationship table and route a line of single-standard data according to the first standard identity of the line of single-standard data and the first mapping relationship table.

12. The apparatus according to claim 9, wherein:
the processor further configured to, before routing the first data received by the input and output circuit, aggregate two or more lines of single-standard data that have the first standard identity into one line of combined single-standard data, wherein a data transmission rate of the combined single-standard data is higher than a data transmission rate of one line of single-standard data; and
the input and output circuit is further configured to send the combined single-standard data aggregated by the processor to the first DU corresponding to the first standard identity of the combined single-standard data.

13. The apparatus according to claim 8, wherein the first standard type and the second standard type are respectively one of the following types: Global System for Mobile Communications (GSM), Time Division-Synchronous Code Division Multiple Access (TD-SCDMA), Code Division Multiple Access 2000 (CDMA2000), Wideband Code Division Multiple Access (WCDMA), Universal Mobile Telecommunications System (UMTS) or Long Term Evolution (LTE).

14. An apparatus, comprising:
an input and output circuit, configured to receive first single-standard data sent by a first digital unit (DU) of a plurality of digital units (DUs), wherein the apparatus is connected to each of the plurality of DUs; and
a processor, configured to route the first single-standard data received by the input and output circuit by selecting a first radio unit (RU) of a plurality of radio units (RUs) to which to route the first single-standard data, wherein the apparatus is connected to each of the plurality of RUs;
wherein the input and output circuit is further configured to receive second single-standard data sent by a second DU, wherein the second single-standard data has a different standard type than a standard type of the first single-standard data;
wherein the processor is further configured to route the second single-standard data received by the input and output circuit by selecting a second RU of the plurality of RUs to which to route the second single-standard data;
wherein the processor is further configured to, in response to determining that the first RU and the second RU are the same, combine a line of the first single-standard data and a line of the second single-standard data into one line of multi-standard data, and send the one line of multi-standard data to the input and output circuit to send to the first RU;
wherein the processor is further configured to, in response to determining that the first RU and the second RU are different, sending the first single-standard data to the input and output circuit to send to the first RU over a first communication path and sending the second single-standard data to the input and output circuit to send to the second RU over a second communication path, wherein the first communication path and the second communication path are different; and
wherein the input and output circuit and the processor communicate through a bus.

15. The apparatus according to claim 14, wherein:
the processor is further configured to acquire a target identity of the first single-standard data before the first single-standard data is routed, the target identity identifying the first RU;
the apparatus further comprises a memory, wherein the memory communicates with the input and output circuit and the processor through the bus; and
the memory is configured to store the target identity acquired by the processor.

16. The apparatus according to claim 15, wherein the processor is further configured to route the first-single-standard data according to the target identity stored by the memory.

17. The apparatus according to claim 15, wherein the processor is further configured to determine that the first RU and the second RU are the same when the target identity of the first single-standard data is the same as a target identity of the second single-standard data.

18. The apparatus according to claim 15, wherein the input and output circuit is further configured to send the one line of multi-standard data to the first RU according to the target identity stored by the memory.

19. The apparatus according to claim 15, wherein the target identity of the first single-standard data acquired by the processor is an identity of the first RU or a port number of the first RU.

20. The apparatus according to claim 14, wherein:
the processor is further configured to, before two or more lines of single-standard data having a same target identity but different standard identities are combined into one line of multi-standard data, break one line of single-standard data down into two or more lines of single-standard subdata, wherein a data rate of each of the two or more lines of single-standard subdata obtained through breakdown is lower than a data rate of the single-standard data before breakdown; and
the processor is further configured to combine the two or more lines of single-standard subdata after breakdown into one line of multi-standard data.

* * * * *